US012699057B2

(12) United States Patent
Li et al.

(10) Patent No.: US 12,699,057 B2
(45) Date of Patent: Aug. 4, 2026

(54) VISUAL INSPECTION SYSTEM AND METHOD

(71) Applicants: CONTEMPORARY AMPEREX TECHNOLOGY CO., LIMITED, Ningde (CN); CONTEMPORARY AMPEREX RUNZHI SOFTWARE TECHNOLOGY LIMITED, Ningde (CN)

(72) Inventors: Wushu Li, Ningde (CN); Guijia Qiu, Ningde (CN)

(73) Assignees: CONTEMPORARY AMPEREX TECHNOLOGY CO., LIMITED, Ningde (CN); CONTEMPORARY AMPEREX RUNZHI SOFTWARE TECHNOLOGY LIMITED, Ningde (CN)

( * ) Notice: Subject to any disclaimer, the term of this patent is extended or adjusted under 35 U.S.C. 154(b) by 299 days.

(21) Appl. No.: 18/433,462

(22) Filed: Feb. 6, 2024

(65) Prior Publication Data

US 2025/0146951 A1 May 8, 2025

Related U.S. Application Data

(63) Continuation of application No. PCT/CN2023/129428, filed on Nov. 2, 2023.

(51) Int. Cl.
G01N 21/93 (2006.01)
G01N 21/27 (2006.01)
(Continued)

(52) U.S. Cl.
CPC ........... G01N 21/93 (2013.01); G01N 21/276 (2013.01); G01N 21/8851 (2013.01); G06T 7/00 (2013.01);
(Continued)

(58) Field of Classification Search
CPC .. G01N 21/93; G01N 25/276; G01N 21/8851; G06T 7/00
(Continued)

(56) References Cited

U.S. PATENT DOCUMENTS 10,399,227 B1 * 9/2019 Islam ..................... B25J 9/1697
2014/0043476 A1 * 2/2014 Stark ..................... G01K 11/12
382/165
(Continued)

FOREIGN PATENT DOCUMENTS

CN 107727963 B 8/2019
CN 115930784 A 4/2023
(Continued)

OTHER PUBLICATIONS

Extended European Search Report issued Jul. 21, 2025 in European Patent Application No. 23889858.9.
(Continued)

*Primary Examiner* — William D Titcomb
(74) *Attorney, Agent, or Firm* — XSENSUS LLP

(57) ABSTRACT

A visual inspection system includes: a visual calibration apparatus, including a calibration member and a calibration member moving apparatus, where the calibration member moving apparatus includes a movable mounting plate, the mounting plate is able to be located at a calibration position within a movement range of the mounting plate, the calibration position is located within an inspection range of a visual inspection apparatus, and the calibration member is disposed on the mounting plate; the visual inspection apparatus, configured to obtain an image of the calibration member and send the image of the calibration member to an upper computer, and the upper computer, configured to
(Continued)

determine, based on the image of the calibration member, a systematic calibration result of the visual inspection apparatus.

24 Claims, 15 Drawing Sheets

(51) Int. Cl.
    *G01N 21/88*          (2006.01)
    *G06T 7/00*           (2017.01)
(52) U.S. Cl.
    CPC ................ *G01N 2021/8887* (2013.01); *G01N 2021/936* (2013.01)
(58) Field of Classification Search
    USPC ......................................................... 382/141
    See application file for complete search history.

(56)                References Cited

U.S. PATENT DOCUMENTS

2017/0269003 A1      9/2017   Enami et al.
2020/0306975 A1*    10/2020   Islam ..................... B25J 9/1692

2022/0330420 A1*    10/2022   Kim ..................... H05K 1/0269
2023/0400294 A1*    12/2023   Jo ......................... G01B 11/254

FOREIGN PATENT DOCUMENTS

CN          115984177 A      4/2023
CN          218941186 U      4/2023
CN          116124006 A      5/2023
CN          116342599 A      6/2023
JP          H06-25969 A      2/1994
JP          H07-208924 A     8/1995

OTHER PUBLICATIONS

Chris Edwards, et al., "NextGen Calibration Utility for Tool Setup and Matching in Real-Time Automated Visual Inspection Systems", 2020 31st Annual Semi Advanced Semiconductor Manufacturing Conference (ASMC), IEEE, Aug. 24, 2020, pp. 1-6, XP033819743, DOI: 10.1109/ASMC49169.2020.9185401 [retrieved on Sep. 2, 2020].

International Search Report issued Jul. 5, 2024 in International Patent Application No. PCT/CN2023/129428.

* cited by examiner

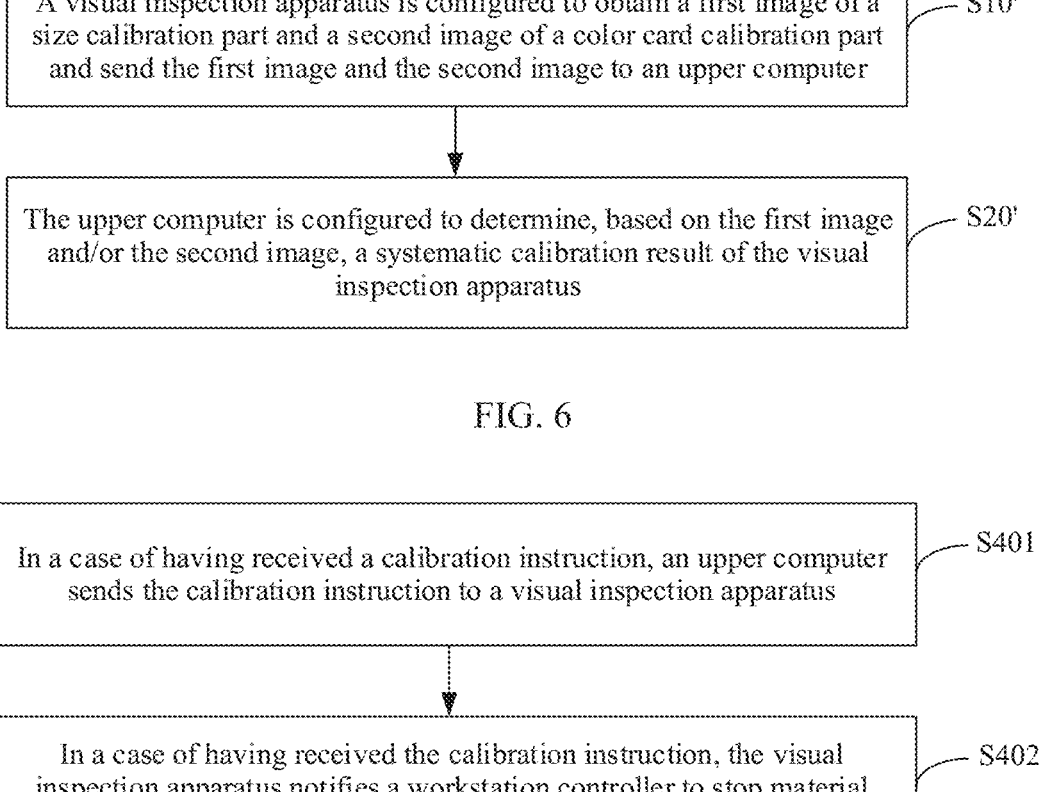

A visual inspection apparatus is configured to obtain a first image of a size calibration part and a second image of a color card calibration part and send the first image and the second image to an upper computer ⟝ S10'

The upper computer is configured to determine, based on the first image and/or the second image, a systematic calibration result of the visual inspection apparatus ⟝ S20'

FIG. 6

In a case of having received a calibration instruction, an upper computer sends the calibration instruction to a visual inspection apparatus ⟝ S401

In a case of having received the calibration instruction, the visual inspection apparatus notifies a workstation controller to stop material delivery ⟝ S402

FIG. 7

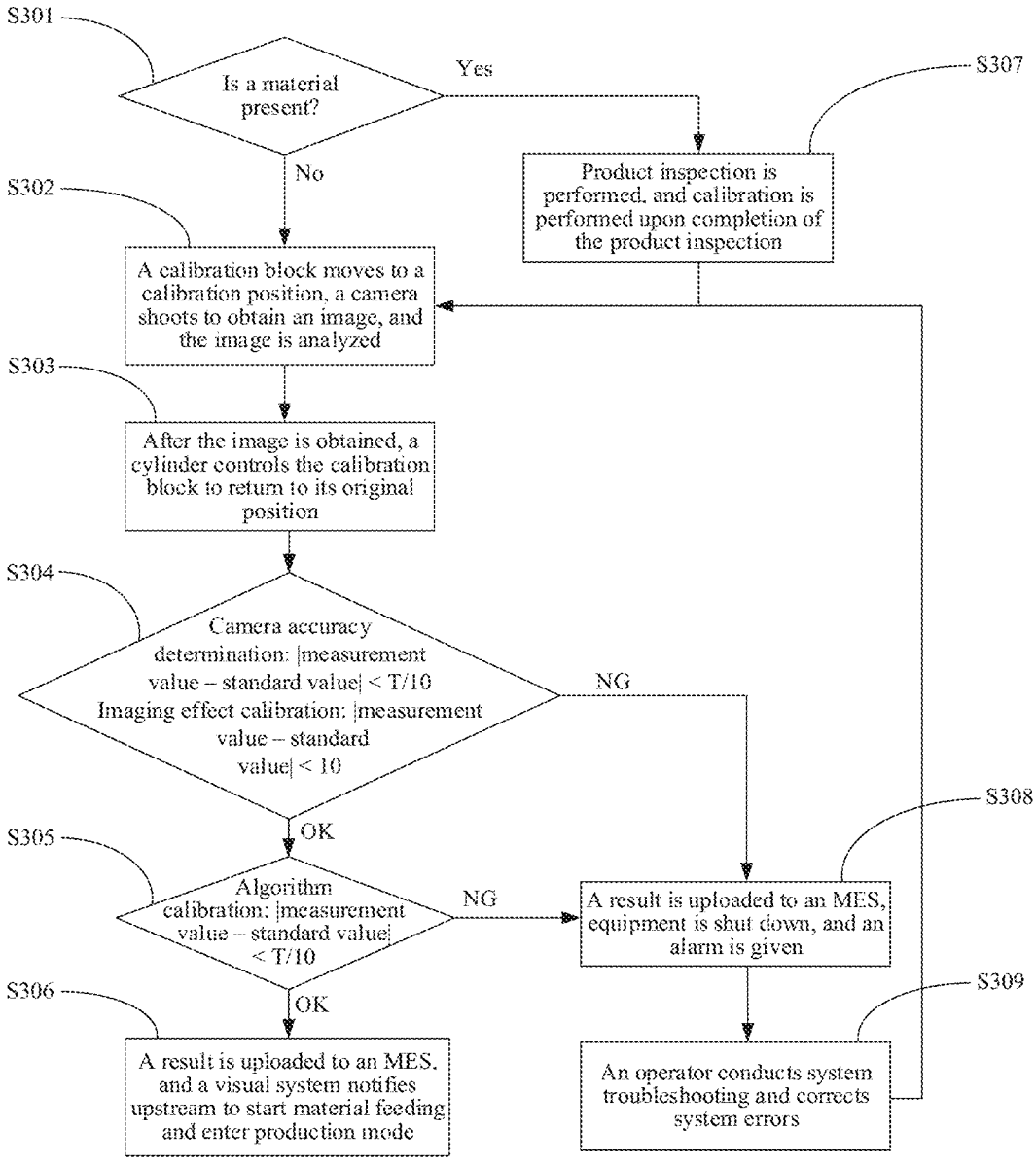

S301

Is a material present?

Yes — S307

No

S302

A calibration block moves to a calibration position, a camera shoots to obtain an image, and the image is analyzed

S307

Product inspection is performed, and calibration is performed upon completion of the product inspection

S303

After the image is obtained, a cylinder controls the calibration block to return to its original position

S304

Camera accuracy determination: |measurement value – standard value| < T/10
Imaging effect calibration: |measurement value – standard value| < 10

NG

OK

S305

Algorithm calibration: |measurement value – standard value| < T/10

NG

S308

A result is uploaded to an MES, equipment is shut down, and an alarm is given

OK

S306

A result is uploaded to an MES, and a visual system notifies upstream to start material feeding and enter production mode

S309

An operator conducts system troubleshooting and corrects system errors

FIG. 8

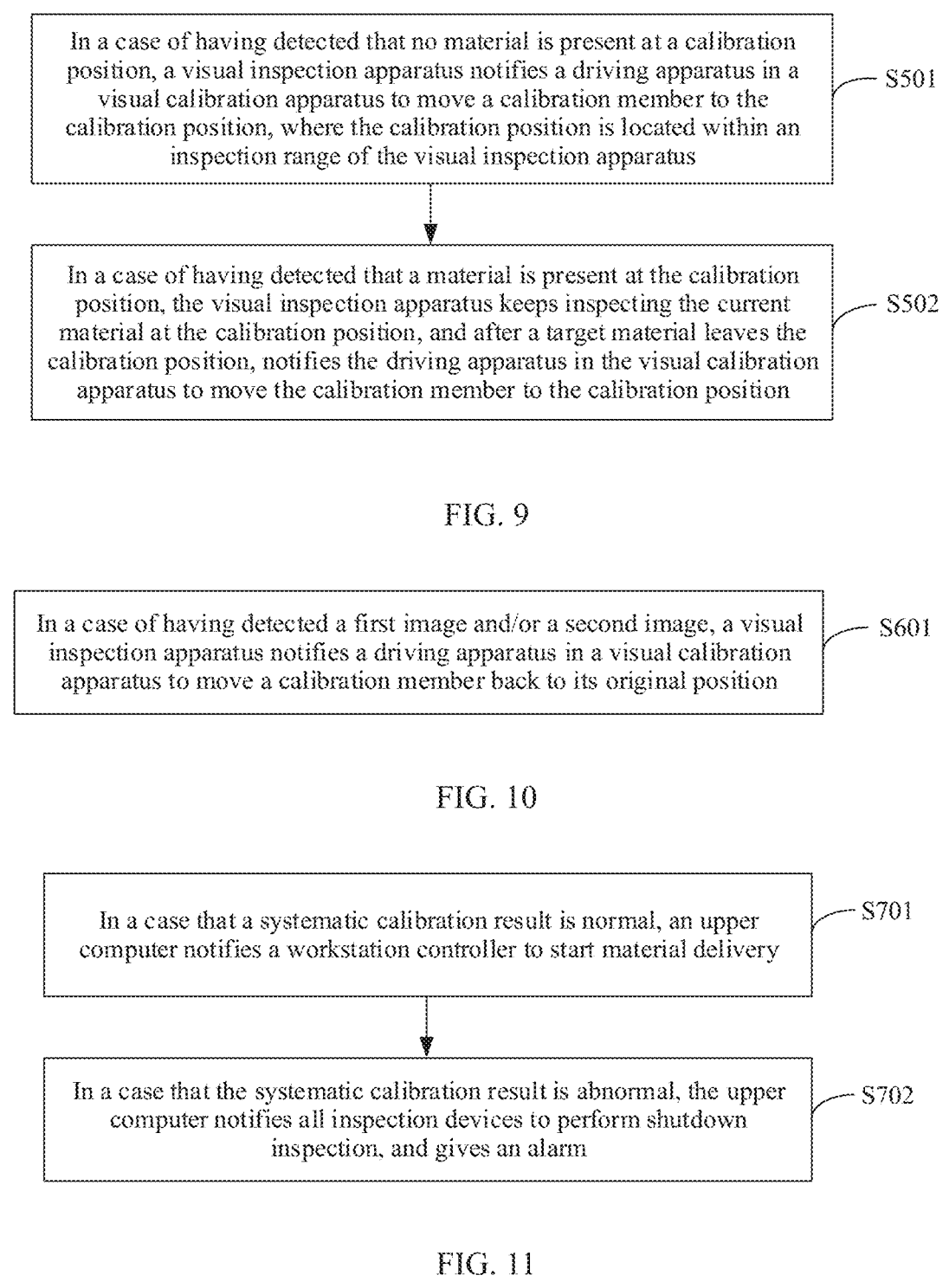

In a case of having detected that no material is present at a calibration position, a visual inspection apparatus notifies a driving apparatus in a visual calibration apparatus to move a calibration member to the calibration position, where the calibration position is located within an inspection range of the visual inspection apparatus — S501

In a case of having detected that a material is present at the calibration position, the visual inspection apparatus keeps inspecting the current material at the calibration position, and after a target material leaves the calibration position, notifies the driving apparatus in the visual calibration apparatus to move the calibration member to the calibration position — S502

FIG. 9

In a case of having detected a first image and/or a second image, a visual inspection apparatus notifies a driving apparatus in a visual calibration apparatus to move a calibration member back to its original position — S601

FIG. 10

In a case that a systematic calibration result is normal, an upper computer notifies a workstation controller to start material delivery — S701

In a case that the systematic calibration result is abnormal, the upper computer notifies all inspection devices to perform shutdown inspection, and gives an alarm — S702

FIG. 11

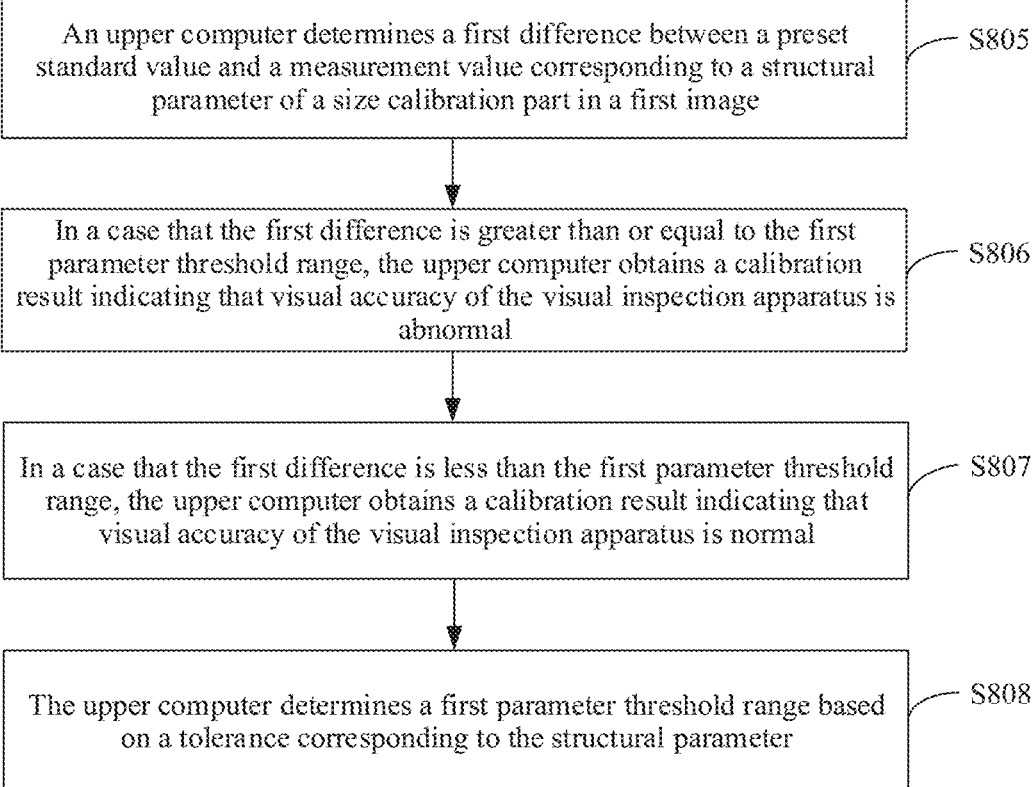

An upper computer determines a first difference between a preset standard value and a measurement value corresponding to a structural parameter of a size calibration part in a first image — S805

In a case that the first difference is greater than or equal to the first parameter threshold range, the upper computer obtains a calibration result indicating that visual accuracy of the visual inspection apparatus is abnormal — S806

In a case that the first difference is less than the first parameter threshold range, the upper computer obtains a calibration result indicating that visual accuracy of the visual inspection apparatus is normal — S807

The upper computer determines a first parameter threshold range based on a tolerance corresponding to the structural parameter — S808

FIG. 13

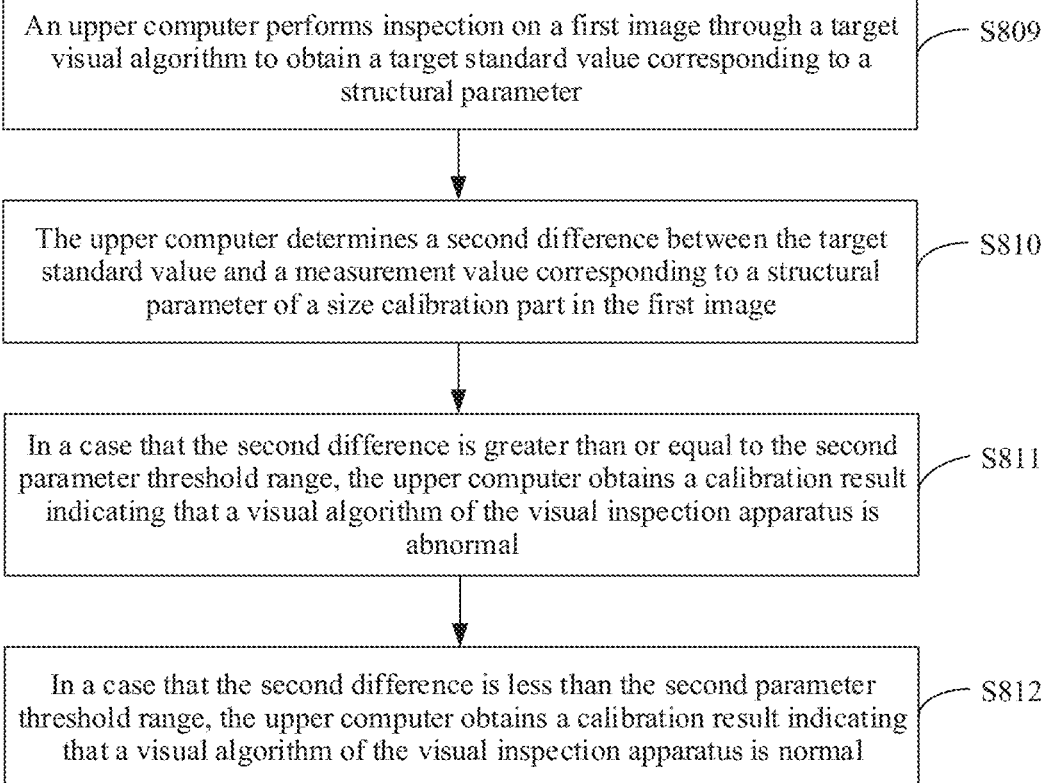

An upper computer performs inspection on a first image through a target visual algorithm to obtain a target standard value corresponding to a structural parameter — S809

The upper computer determines a second difference between the target standard value and a measurement value corresponding to a structural parameter of a size calibration part in the first image — S810

In a case that the second difference is greater than or equal to the second parameter threshold range, the upper computer obtains a calibration result indicating that a visual algorithm of the visual inspection apparatus is abnormal — S811

In a case that the second difference is less than the second parameter threshold range, the upper computer obtains a calibration result indicating that a visual algorithm of the visual inspection apparatus is normal — S812

FIG. 14

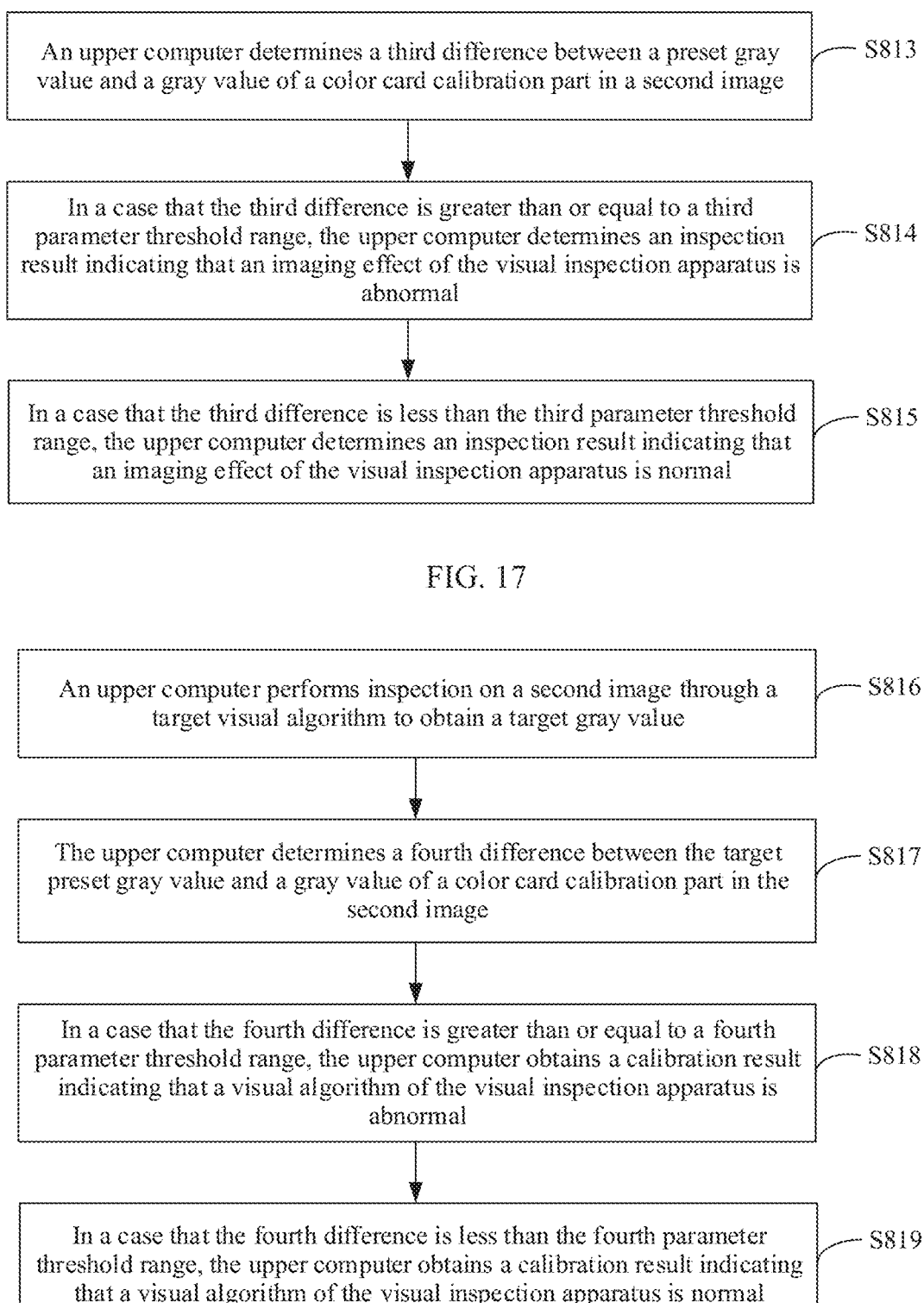

An upper computer determines a third difference between a preset gray value and a gray value of a color card calibration part in a second image — S813

In a case that the third difference is greater than or equal to a third parameter threshold range, the upper computer determines an inspection result indicating that an imaging effect of the visual inspection apparatus is abnormal — S814

In a case that the third difference is less than the third parameter threshold range, the upper computer determines an inspection result indicating that an imaging effect of the visual inspection apparatus is normal — S815

FIG. 17

An upper computer performs inspection on a second image through a target visual algorithm to obtain a target gray value — S816

The upper computer determines a fourth difference between the target preset gray value and a gray value of a color card calibration part in the second image — S817

In a case that the fourth difference is greater than or equal to a fourth parameter threshold range, the upper computer obtains a calibration result indicating that a visual algorithm of the visual inspection apparatus is abnormal — S818

In a case that the fourth difference is less than the fourth parameter threshold range, the upper computer obtains a calibration result indicating that a visual algorithm of the visual inspection apparatus is normal — S819

FIG. 18

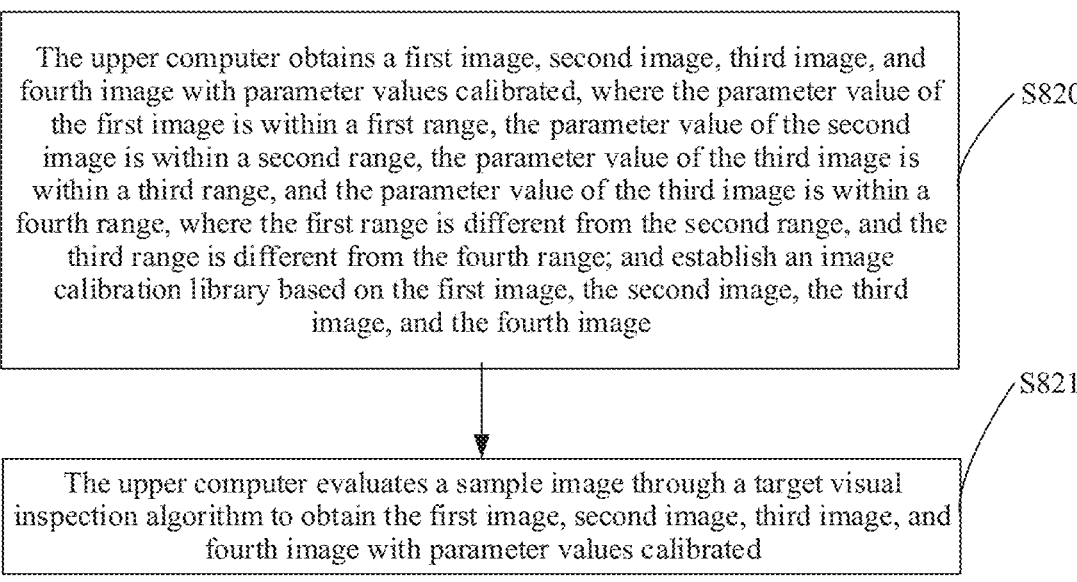

The upper computer obtains a first image, second image, third image, and fourth image with parameter values calibrated, where the parameter value of the first image is within a first range, the parameter value of the second image is within a second range, the parameter value of the third image is within a third range, and the parameter value of the third image is within a fourth range, where the first range is different from the second range, and the third range is different from the fourth range; and establish an image calibration library based on the first image, the second image, the third image, and the fourth image — S820

The upper computer evaluates a sample image through a target visual inspection algorithm to obtain the first image, second image, third image, and fourth image with parameter values calibrated — S821

FIG. 19

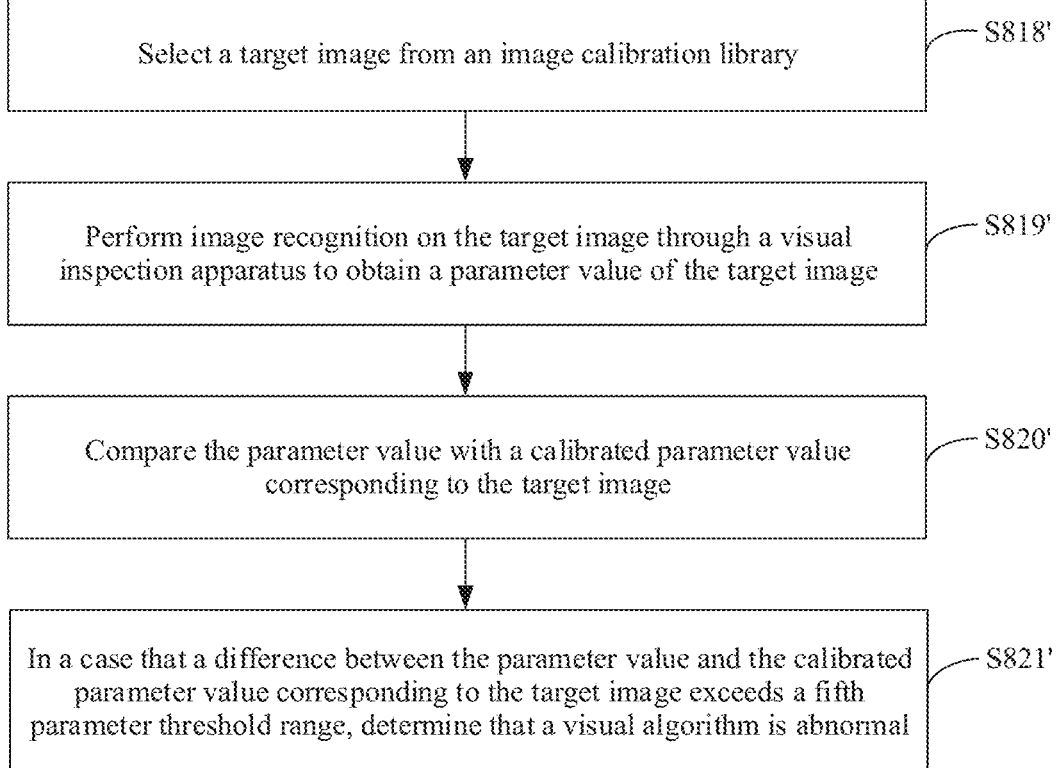

Select a target image from an image calibration library — S818'

Perform image recognition on the target image through a visual inspection apparatus to obtain a parameter value of the target image — S819'

Compare the parameter value with a calibrated parameter value corresponding to the target image — S820'

In a case that a difference between the parameter value and the calibrated parameter value corresponding to the target image exceeds a fifth parameter threshold range, determine that a visual algorithm is abnormal — S821'

FIG. 20

VISUAL INSPECTION SYSTEM AND METHOD

CROSS-REFERENCE TO RELATED APPLICATION

The present application is a continuation of International Application No. PCT/CN2023/129428, filed Nov. 2, 2023, which is incorporated herein by reference in its entirety.

TECHNICAL FIELD

This application relates to the field of visual inspection technology.

BACKGROUND

In general, conventional measurement tool calibration is manually operated. Apart from the inconvenience in operation and the need for skilled workers to operate, both operation and analysis are time-consuming, leading to great production capacity loss in the production line.

It is intended to solve the problem of excessively long calibration time of the existing spot inspection method for production lines.

SUMMARY

According to a first aspect, this application provides a visual inspection system, where the visual inspection system includes:

a visual calibration apparatus, including a calibration member and a calibration member moving apparatus, where the calibration member moving apparatus includes a movable mounting plate, the mounting plate is able to be located at a calibration position within a movement range of the mounting plate, the calibration position is located within an inspection range of a visual inspection apparatus, and the calibration member is disposed on the mounting plate;

the visual inspection apparatus, configured to obtain an image of the calibration member and send the image of the calibration member to an upper computer; and the upper computer, configured to determine, based on the image of the calibration member, a systematic calibration result of the visual inspection apparatus.

In the technical solutions of the embodiments of this application, during system calibration, the calibration member is integrated on the mounting plate, and the mounting plate is driven to move the calibration member. In this way, fully automatic calibration is implemented in an automatic manner, solving the problems of long calibration time and great production capacity loss that are easily caused by less skilled operators.

In some embodiments, the calibration member includes a plurality of size calibration parts with a gradient change in size and a plurality of color card calibration parts with a gradient change in gray value;

the visual inspection apparatus is further configured to obtain a first image of the size calibration part and a second image of the color card calibration part and send the first image and the second image to the upper computer; and the upper computer is further configured to determine, based on the first image and/or the second image, the systematic calibration result of the visual inspection apparatus.

In the technical solutions of the embodiments of this application, the calibration member is provided with the plurality of size calibration parts with a gradient change in size, to effectively implement accuracy calibration within measurement ranges of measurement tools including 2D cameras and 3D cameras, thereby ensuring that linear displacement of the measurement tool is calibrated. The linear displacement is a linear error or endpoint linearity that measures the maximum deviation of a straight line formed by endpoints passing through the entire measurement range, or a deviation between an actual measurement curve and an ideal straight line. In addition, a distortion-induced accuracy error of a lens of the 2D camera can be calibrated. On the basis of the accuracy calibration having been implemented, algorithm calibration is further performed, thereby implementing systematic calibration of the visual inspection apparatus.

In some embodiments, the calibration member is detachably mounted on the mounting plate.

In the technical solutions of the embodiments of this application, quick-release locking of the calibration member is implemented using a detachable member on the mounting plate on which the calibration member is mounted, facilitating true value measurement of a measurement system with quadratic or higher accuracy.

In some embodiments, the visual calibration apparatus further includes:

a support base; and a driving apparatus, including a fixed part and a movable part moving linearly relative to each other, where the fixed part is disposed on the support base, and the movable part is connected to the mounting plate.

In the technical solutions of the embodiments of this application, the calibration member is driven to move so as to implement fully automatic calibration of the visual inspection apparatus.

In some embodiments, the visual calibration apparatus further includes a sliding guide structure, where the sliding guide structure includes a sliding rail and a slider in sliding fit with each other, and the sliding rail and the slider are disposed between the support base and the mounting plate.

In the technical solutions of the embodiments of this application, under a condition that the mounting plate on which the calibration member is mounted is driven by a driving apparatus, a sliding apparatus determines a movement trajectory of the mounting plate on which the calibration member is mounted, improving the movement accuracy of the calibration member.

In some embodiments, the visual calibration apparatus further includes an adapting seat, the sliding rail is provided in two, and the slider is correspondingly provided in two.

The sliding rail and the slider fitting with each other as one set are disposed between the support base and the adapting seat, and the sliding rail and the slider fitting with each other as another set are disposed between the mounting plate and the adapting seat.

In the technical solutions of the embodiments of this application, movement of the mounting plate is implemented using a plurality of sliding apparatuses, implementing accurate control of the movement of the mounting plate.

In some embodiments, the calibration member includes:

a plate body having a calibration surface; and a plurality of size calibration parts spaced apart on the calibration surface in a linear direction, where the plurality of size calibration parts each have a length dimension in a first direction and a width dimension in a second direction, with a gradient change in the length dimensions of the plurality of size calibration parts and/or a gradient change in the width dimensions of the plurality of size calibration parts, where the first direction and the second direction are directions perpendicular to each other in a horizontal plane.

In the technical solutions of the embodiments of this application, the calibration member is provided with the plurality of size calibration parts with a gradient change in size, to effectively implement accuracy calibration within measurement ranges of measurement tools including 2D cameras and 3D cameras, thereby ensuring that linear displacement of the measurement tool is calibrated. The linear displacement is a linear error or endpoint linearity that measures the maximum deviation of a straight line formed by endpoints passing through the entire measurement range, or a deviation between an actual measurement curve and an ideal straight line. In addition, a distortion-induced accuracy error of a lens of the 2D camera can be calibrated, improving the accuracy of visual inspection.

In some embodiments, the size calibration part includes a protrusion or recess formed on the plate body.

In the technical solutions of the embodiments of this application, dimension information of the protrusion or recess on the calibration member is obtained to determine whether an error between the dimension information and predetermined dimension information is within a reasonable error range, so as to achieve the accuracy calibration of the camera.

In some embodiments, sizes of the plurality of size calibration parts in a third direction exhibit a gradient change.

In the technical solutions of the embodiments of this application, the calibration member is provided with the plurality of size calibration parts with a gradient change in size, to effectively implement accuracy calibration within measurement ranges of measurement tools including 2D cameras and 3D cameras, thereby ensuring that linear displacement of the measurement tool is calibrated.

In some embodiments, color card calibration parts disposed on the calibration surface of the plate body and having a gradient change in gray value are further included.

In the technical solutions of the embodiments of this application, the calibration member is provided with a colourimetric card to implement calibration of an imaging effect. For a color card of the calibration member, it is required that a black and white camera is equipped with a standard color card with three gradients: light gray, gray, and dark gray, thereby implementing calibration of the imaging effect of the black and white camera.

In some embodiments, the color card calibration part includes a three-primary-color card.

In the technical solutions of the embodiments of this application, a color camera is equipped with an RGB primary color card, thereby implementing calibration of the imaging effect of the color camera.

In some embodiments, a material of the plate body includes aluminum alloy; and/or roughness of the calibration surface of the plate body is less than a preset roughness threshold.

In the technical solutions of the embodiments of this application, the material of the plate body includes aluminum alloy, and the roughness of the calibration surface of the plate body is adjusted, thereby improving the imaging effect of the plurality of size calibration parts with a gradient change in size and the plurality of color card calibration parts with a gradient change in gray value.

According to a second aspect, this application further provides a visual inspection method, where a visual inspection system includes a visual inspection apparatus, a visual calibration apparatus, and an upper computer, where the visual calibration apparatus includes a calibration member and a calibration member moving apparatus, the calibration member moving apparatus includes a movable mounting plate, the mounting plate is able to be located at a calibration position within a movement range of the mounting plate, the calibration position is located within an inspection range of the visual inspection apparatus, and the calibration member is disposed on the mounting plate; and the visual inspection method includes:

obtaining, by the visual inspection apparatus, an image of the calibration member and sending the image of the calibration member to the upper computer; and determining, by the upper computer based on the image of the calibration member, a systematic calibration result of the visual inspection apparatus.

In the technical solutions of the embodiments of this application, during system calibration, the calibration member is integrated on the mounting plate, and the mounting plate is driven to move the calibration member. In this way, fully automatic calibration is implemented in an automatic manner, solving the problems of long calibration time and great production capacity loss that are easily caused by less skilled operators.

In some embodiments, the calibration member includes a plurality of size calibration parts with a gradient change in size and a plurality of color card calibration parts with a gradient change in gray value, and the visual inspection method further includes:

obtaining, by the visual inspection apparatus, a first image of the size calibration part and a second image of the color card calibration part and sending the first image and the second image to the upper computer; and determining, by the upper computer based on the first image and/or the second image, the systematic calibration result of the visual inspection apparatus.

In the technical solutions of the embodiments of this application, the calibration member is provided with the plurality of size calibration parts with a gradient change in size, to effectively implement accuracy calibration within measurement ranges of measurement tools including 2D cameras and 3D cameras, thereby ensuring that linear displacement of the measurement tool is calibrated. The linear displacement is a linear error or endpoint linearity that measures the maximum deviation of a straight line formed by endpoints passing through the entire measurement range, or a deviation between an actual measurement curve and an ideal straight line. In addition, a distortion-induced accuracy error of a lens of the 2D camera can be calibrated. On the basis of the accuracy calibration having been implemented, algorithm calibration is further performed, thereby implementing systematic calibration of the visual inspection apparatus.

In some embodiments, the systematic calibration result includes a visual accuracy calibration result, an imaging effect calibration result, and a visual algorithm calibration result. The visual inspection method further includes:

notifying a device to be inspected to stop operating, in a case that any one of the visual accuracy calibration result, the imaging effect calibration result, and the visual algorithm calibration result is an abnormal result.

In the technical solutions of the embodiments of this application, to ensure production safety of a production line and prevent delivery of defective products, the production line is shut down for inspection in a timely manner when problems are detected in visual accuracy, visual imaging, and visual algorithm on the production line, implementing effective control of monitoring of the production line.

In some embodiments, the visual inspection method further includes:

in a case that the systematic calibration result is a normal result, determining the end of a calibration mode and notifying relevant production equipment to enter a production mode.

In the technical solutions of the embodiments of this application, in a production calibration process, to prevent interference from other materials during calibration and other influencing factors in the production process, it is necessary to suspend material delivery to the production line and switch the calibration mode. However, at the end of calibration, it is necessary to resume production as soon as possible and automatically recover the production mode, thereby improving the automated management of the production line.

In some embodiments, the visual inspection method further includes:

in a case of having received a calibration instruction, sending, by the upper computer, the calibration instruction to the visual inspection apparatus; and in a case of having received the calibration instruction, notifying, by the visual inspection apparatus, a workstation controller to stop material delivery.

In the technical solutions of the embodiments of this application, in a production calibration process, to prevent interference from other materials during calibration and other influencing factors in the production process, material delivery to the production line is suspended, thereby improving the accuracy of calibration.

In some embodiments, the visual inspection method further includes:

in a case of having detected that no material is present at a calibration position upon inspection by the visual inspection apparatus, notifying, by the visual inspection apparatus, a driving apparatus in the visual calibration apparatus to move the calibration member to the calibration position, where the calibration position is located within the inspection range of the visual inspection apparatus.

In the technical solutions of the embodiments of this application, the driving apparatus moves the calibration member to a position for inspection, without requiring manual operations on the calibration member. In this way, fully automatic calibration is implemented, solving the problems of long calibration time and great production capacity loss that are easily caused by less skilled operators.

In some embodiments, the visual inspection method further includes:

in a case of having detected that a material is present at the calibration position upon inspection by the visual inspection apparatus, notifying, by the visual inspection apparatus, the visual inspection apparatus to keep inspecting the current material at the calibration position, and after the target material leaves the calibration position, notifying the driving apparatus in the visual calibration apparatus to move the calibration member to the calibration position to allow a light source in the visual inspection apparatus to irradiate the calibration member.

In the technical solutions of the embodiments of this application, the visual inspection apparatus determines, through a sensor, whether a material is present at the position for inspection, and inspects the last product if a material is present at the position for inspection, thereby implementing fully automatic calibration and improving the calibration efficiency.

In some embodiments, the visual inspection method further includes:

in a case of having detected the first image and/or the second image, notifying, by the visual inspection apparatus, the driving apparatus in the visual calibration apparatus to move the calibration member back to its original position.

In the technical solutions of the embodiments of this application, after a calibration image is obtained, the driving apparatus automatically moves the calibration member back to its original position, without requiring manual operations on the calibration member. In this way, fully automatic calibration is implemented, solving the problems of long calibration time and great production capacity loss that are easily caused by less skilled operators.

In some embodiments, the visual inspection method further includes:

in a case that the systematic calibration result is normal, notifying, by the upper computer, the workstation controller to start material delivery; and in a case that the systematic calibration result is abnormal, notifying, by the upper computer, all inspection devices to perform shutdown inspection, and giving an alarm.

In the technical solutions of the embodiments of this application, the upper computer controls the production line based on the systematic calibration result; in a case that the systematic calibration result is normal, notifies the workstation controller to start material delivery, thereby improving the processing efficiency of the production line; or in a case that the systematic calibration result is abnormal, notifies all inspection devices to perform shutdown inspection, and gives an alarm, thereby improving effective monitoring of the production line.

In some embodiments, the visual inspection method further includes:

performing, by the upper computer, visual accuracy calibration based on the first image to obtain a visual accuracy calibration result;

performing, by the upper computer, imaging effect calibration based on the second image to obtain an imaging effect calibration result;

in a case that both the visual accuracy calibration result and the imaging effect calibration result are normal calibration results, performing, by the upper computer, visual algorithm calibration based on a target image to obtain a visual algorithm calibration result; and determining, by the upper computer, the systematic calibration result of the visual inspection apparatus based on the visual accuracy calibration result, the imaging effect calibration result, and the visual algorithm calibration result.

In the technical solutions of the embodiments of this application, the calibration member is provided with the plurality of size calibration parts with a gradient change in size, to effectively implement accuracy calibration within measurement ranges of measurement tools including 2D cameras and 3D cameras. In addition, on the basis of the accuracy calibration having been implemented, algorithm calibration is further performed, thereby implementing systematic calibration of the visual inspection apparatus.

In some embodiments, the performing, by the upper computer, visual accuracy calibration based on the first image to obtain a visual accuracy calibration result includes:

determining the visual accuracy calibration result of the visual inspection apparatus based on a measurement value corresponding to a structural parameter of the size calibration part in the first image.

In the technical solutions of the embodiments of this application, the measurement value corresponding to the structural parameter is compared to obtain the visual accuracy calibration result, so that the visual accuracy calibration is implemented through quantitative data, thereby improving the accuracy of visual inspection.

In some embodiments, the determining, by the upper computer, the visual accuracy calibration result of the visual inspection apparatus based on a measurement value corresponding to a structural parameter includes:

determining a first difference between a preset standard value and the measurement value corresponding to the structural parameter; and determining, based on the first difference, the visual accuracy calibration result of the visual inspection apparatus.

In the technical solutions of the embodiments of this application, the visual accuracy calibration result is obtained based on a difference between the measurement value corresponding to the structural parameter and a standard value corresponding to an actual inspection target, so that an error between an image analysis result and an actual result can be effectively obtained, thereby obtaining the accuracy of visual inspection more accurately.

In some embodiments, the determining, by the upper computer based on the first difference, the visual accuracy calibration result of the visual inspection apparatus includes:

determining, based on the first difference and a first parameter threshold range, the visual accuracy calibration result of the visual inspection apparatus.

In the technical solutions of the embodiments of this application, the difference between the measurement value corresponding to the structural parameter and the standard value corresponding to the actual inspection target is compared with the parameter threshold range, so as to obtain the visual accuracy calibration result. Compared to a case that a comparison is made based on the difference only, a specified threshold range is given, and an inspection result is considered abnormal only if the difference exceeds the range, thereby improving the accuracy of visual accuracy inspection.

In some embodiments, the performing, by the upper computer, visual accuracy calibration based on the first image to obtain a visual accuracy calibration result includes:

determining, by the upper computer, a first difference between a preset standard value and a measurement value corresponding to a structural parameter of the size calibration part in the first image; and in a case that the first difference is greater than or equal to a first parameter threshold range, obtaining, by the upper computer, a calibration result indicating that visual accuracy of the visual inspection apparatus is abnormal; or in a case that the first difference is less than the first parameter threshold range, obtaining, by the upper computer, a calibration result indicating that visual accuracy of the visual inspection apparatus is normal.

In the technical solutions of the embodiments of this application, the difference between the measurement value corresponding to the structural parameter and a standard value corresponding to an actual inspection target is compared with the parameter threshold range, and an inspection result is considered normal only if the difference does not exceed the range, thereby improving the accuracy of visual accuracy inspection.

In some embodiments, the following step is further included:

determining, by the upper computer, the first parameter threshold range based on a tolerance corresponding to the structural parameter.

In the technical solutions of the embodiments of this application, before the parameter threshold range is obtained, the parameter threshold range is determined based on the tolerance corresponding to the structural parameter. Since different structural parameters correspond to different standards, determining the parameter threshold range based the tolerance corresponding to the parameter makes the parameter threshold range adapted to the structural parameter, thereby improving the rationality of visual accuracy inspection.

In some embodiments, the visual inspection method further includes:

determining, by the upper computer, a second difference between a target standard value and the measurement value corresponding to the structural parameter of the size calibration part in the first image; and determining, based on the second difference, a first visual algorithm calibration result of the visual inspection apparatus.

In the technical solutions of the embodiments of this application, the measurement value corresponding to the structural parameter is compared with a measurement value of the structural parameter analyzed through a normal visual inspection algorithm, so as to obtain a difference between an analysis result of a current visual algorithm and an analysis result detected through the normal visual inspection algorithm. In this way, a difference between the current visual algorithm and the normal visual inspection algorithm is obtained, thereby implementing calibration of the visual algorithm.

In some embodiments, before the determining a second difference between the measurement value corresponding to the structural parameter and a standard value corresponding to a target structural parameter, the method further includes:

performing inspection on the first image through a target visual algorithm to obtain a target standard value corresponding to the structural parameter.

In the technical solutions of the embodiments of this application, to more effectively obtain the difference between the current visual algorithm and the normal visual inspection algorithm, the size calibration part is analyzed through the target visual algorithm to obtain the target standard value corresponding to the structural parameter, so that the target standard value can be compared with the measurement value corresponding to the structural parameter, thereby achieving a unified standard for comparison between the current visual algorithm and the normal visual inspection algorithm, and improving the accuracy of visual algorithm calibration.

In some embodiments, the determining, based on the second difference, a first visual algorithm calibration result of the visual inspection apparatus includes:

determining, based on the second difference and a second parameter threshold range, the first visual algorithm calibration result of the visual inspection apparatus.

In the technical solutions of the embodiments of this application, the parameter threshold range is compared with the difference between the measurement value corresponding to the structural parameter and a standard value corresponding to the normal visual inspection algorithm, so as to obtain a visual algorithm calibration result. Compared to a case that a comparison is made based on the difference only, a specified threshold range is given, and the visual algorithm is considered abnormal only if the difference exceeds the range, thereby improving the accuracy of visual algorithm calibration.

In some embodiments, the visual inspection method further includes:

performing, by the upper computer, inspection on the first image through a target visual algorithm to obtain a target standard value corresponding to the structural parameter;

determining, by the upper computer, a second difference between the target standard value and the measurement value corresponding to the structural parameter of the size calibration part in the first image; and in a case that the second difference is greater than or equal to a second parameter threshold range, obtaining, by the upper computer, a calibration result indicating that a result of a visual algorithm of the visual inspection apparatus is abnormal; or in a case that the second difference is less than the second parameter threshold range, obtaining, by the upper computer, a calibration result indicating that a result of a visual algorithm of the visual inspection apparatus is normal.

In the technical solutions of the embodiments of this application, the difference between the measurement value corresponding to the structural parameter and the standard value corresponding to the normal visual inspection algorithm is compared with the parameter threshold range, so as to obtain a visual algorithm calibration result, thereby improving the accuracy of visual algorithm calibration.

In some embodiments, the performing imaging effect calibration based on the second image to obtain an imaging effect calibration result includes:

obtaining the imaging effect calibration result based on a gray value of the color card calibration part in the second image.

In the technical solutions of the embodiments of this application, the calibration member is provided with a colourimetric card, thus further implementing calibration of the imaging effect on the basis of implementing visual accuracy calibration.

In some embodiments, the obtaining the imaging effect calibration result based on a gray value of the color card calibration part in the second image includes:

determining a third difference between the gray value and a preset gray value; and determining, based on the third difference, an inspection result of imaging effect of the visual inspection apparatus.

In the technical solutions of the embodiments of this application, the imaging effect calibration result is obtained based on a difference between the gray value and a gray value corresponding to an actual inspection target, so that an error between an image analysis result and an actual result can be effectively obtained, thereby implementing inspection of the imaging effect more accurately.

In some embodiments, the determining, based on the third difference, an inspection result of imaging effect from the visual inspection apparatus includes:

determining, based on the third difference and a third parameter threshold range, the inspection result of imaging effect of the visual inspection apparatus.

In the technical solutions of the embodiments of this application, a difference between a current gray value and a standard value corresponding to the actual inspection target is compared with the parameter threshold range, so as to obtain the imaging effect calibration result. Compared to a case that a comparison is made based on the difference only, a specified threshold range is given, and an inspection result is considered abnormal only if the difference exceeds the range, thereby improving the accuracy of imaging effect inspection.

In some embodiments, the performing, by the upper computer, imaging effect calibration based on the second image to obtain an imaging effect calibration result includes:

determining, by the upper computer, a third difference between a preset gray value and the gray value of the color card calibration part in the second image; and in a case that the third difference is greater than or equal to a third parameter threshold range, determining, by the upper computer, an inspection result indicating that an imaging effect of the visual inspection apparatus is abnormal; or in a case that the third difference is less than the third parameter threshold range, determining, by the upper computer, an inspection result indicating that an imaging effect of the visual inspection apparatus is normal.

In the technical solutions of the embodiments of this application, the difference between the current gray value and the standard value corresponding to the actual inspection target is compared with the parameter threshold range, so as to obtain the imaging effect calibration result. With a specified threshold range given, an inspection result is considered abnormal only if the difference exceeds that range, thereby improving the accuracy of imaging effect inspection.

In some embodiments, the visual inspection method further includes:

obtaining a second visual algorithm calibration result of the visual inspection apparatus based on the gray value of the color card calibration part in the second image.

In the technical solutions of the embodiments of this application, in addition to being used for imaging effect inspection, the gray value may also be used for visual algorithm calibration, so as to implement systematic visual calibration, thereby implementing more comprehensive and effective monitoring of the production line.

In some embodiments, the obtaining a second visual algorithm calibration result of the visual inspection apparatus based on the gray value of the color card calibration part in the second image includes:

obtaining the second visual algorithm calibration result of the visual inspection apparatus based on a fourth difference between a target gray value and the gray value of the color card calibration part in the second image.

In the technical solutions of the embodiments of this application, the gray value is compared with a gray value obtained by analysis through the normal visual inspection algorithm, so as to obtain a difference between an analysis result of the current visual algorithm and an analysis result detected through the normal visual inspection algorithm. In this way, a difference between the current visual algorithm and the normal visual inspection algorithm is obtained, thereby implementing calibration of the visual algorithm.

In some embodiments, before the obtaining a second visual algorithm calibration result of the visual inspection apparatus based on a fourth difference between a target gray value and the gray value of the color card calibration part in the second image, the method further includes:

performing inspection on the second image through a target visual algorithm to obtain a target gray value.

In the technical solutions of the embodiments of this application, to more effectively obtain the difference between the current visual algorithm and the normal visual inspection algorithm, the colourimetric card is analyzed through the target visual algorithm to obtain a target standard value corresponding to the colourimetric card, so that the target standard value can be compared with a gray value obtained by analysis through the current visual algorithm, so as to achieve a unified standard of comparison between the current visual algorithm and the normal visual inspection algorithm, thereby improving the accuracy of visual algorithm calibration.

In some embodiments, the obtaining a second visual algorithm calibration result of the visual inspection apparatus based on a fourth difference between a target gray value and the gray value of the color card calibration part in the second image includes:

determining, based on the fourth difference and a fourth parameter threshold range, the second visual algorithm calibration result of the visual inspection apparatus.

In the technical solutions of the embodiments of this application, a difference between a gray value corresponding to the current visual algorithm and the standard value corresponding to the normal visual inspection algorithm is compared with the parameter threshold range, so as to obtain a visual algorithm calibration result. Compared to a case that a comparison is made based on the difference only, a specified threshold range is given, and the visual algorithm is considered abnormal only if the difference exceeds the range, thereby improving the accuracy of visual algorithm calibration.

In some embodiments, the visual inspection method further includes:

performing, by the upper computer, inspection on the second image through a target visual algorithm to obtain a target gray value;

determining, by the upper computer, a fourth difference between a target gray value and a gray value of the color card calibration part in the second image; and in a case that the fourth difference is greater than or equal to a fourth parameter threshold range, obtaining, by the upper computer, a calibration result indicating that a result of a visual algorithm of the visual inspection apparatus is abnormal; or in a case that the fourth difference is less than the fourth parameter threshold range, obtaining, by the upper computer, a calibration result indicating that a result of a visual algorithm of the visual inspection apparatus is normal.

In the technical solutions of the embodiments of this application, a difference between a gray value corresponding to the current visual algorithm and the standard value corresponding to the normal visual inspection algorithm is compared with the parameter threshold range, so as to obtain a visual algorithm calibration result. Compared to a case that a comparison is made based on the difference only, a specified threshold range is given, and the visual algorithm is considered abnormal only if the difference exceeds the range, thereby improving the accuracy of visual algorithm calibration.

In some embodiments, the visual inspection method further includes:

determining the systematic calibration result of the visual inspection apparatus based on an inspection value and standard value corresponding to the first image.

In the technical solutions of the embodiments of this application, the inspection value is compared with the standard value to obtain the systematic calibration result of the visual inspection apparatus, so that the systematic calibration result of the visual inspection apparatus is implemented through quantitative data, thereby improving the accuracy of systematic calibration of the visual inspection apparatus.

In some embodiments, the visual inspection method further includes:

determining the systematic calibration result of the visual inspection apparatus based on an inspection value and standard value corresponding to the second image.

In the technical solutions of the embodiments of this application, the measurement value corresponding to the structural parameter is compared with the standard value to obtain the visual accuracy calibration result, and the gray value of the colourimetric card is compared with the standard value to obtain the imaging effect calibration result, so that the systematic calibration of the visual inspection apparatus is implemented through quantitative data, thereby improving the accuracy of systematic calibration.

In some embodiments, the visual inspection method further includes:

determining the systematic calibration result of the visual inspection apparatus based on the inspection value and standard value corresponding to the first image and the inspection value and standard value corresponding to the second image.

In the technical solutions of the embodiments of this application, the visual accuracy calibration and the imaging effect calibration are implemented through both the images of the plurality of size calibration parts with a gradient change in size and the images of the color card calibration parts with a gradient change in gray value, and then the visual algorithm calibration is implemented based on the visual accuracy calibration and the imaging effect calibration, thereby implementing the systematic calibration of the visual inspection apparatus.

In some embodiments, before the performing, by the upper computer, visual algorithm calibration based on a target image to obtain a visual algorithm calibration result, the method further includes:

obtaining, by the upper computer, a first image, second image, third image, and fourth image with parameter values calibrated, where the parameter value of the first image is within a first range, the parameter value of the second image is within a second range, the parameter value of the third image is within a third range, and the parameter value of the fourth image is within a fourth range, where the first range is different from the second range, and the third range is different from the fourth range; and establishing an image calibration library based on the first image, the second image, the third image, and the fourth image.

In the technical solutions of the embodiments of this application, as compared to direct comparison of the calibration result, implementing the visual algorithm inspection through the pre-established image calibration library achieves higher calibration efficiency.

In some embodiments, the establishing, by the upper computer, an image calibration library based on the first image, the second image, the third image, and the fourth image includes:

numbering, by the upper computer, the first image, the second image, the third image, and the fourth image; and establishing the image calibration library based on the numbered first image, second image, third image, and fourth image.

In the technical solutions of the embodiments of this application, during establishment of the image calibration library, image samples are managed through numbering, thereby implementing effective management of the image calibration library and also facilitating subsequent adjustment and update of the image calibration library.

In some embodiments, before the obtaining a first image, second image, third image, and fourth image with parameter values calibrated, the method further includes:

evaluating a sample image through a target visual inspection algorithm so as to obtain the first image, second image, third image, and fourth image with parameter values calibrated.

In the technical solutions of the embodiments of this application, the sampled image is evaluated in advance through an improved visual inspection algorithm, and an evaluated parameter value is used as a standard value for subsequent comparison, to implement the visual algorithm calibration.

In some embodiments, the performing, by the upper computer, visual algorithm calibration based on a target image to obtain a visual algorithm calibration result includes:

selecting, by the upper computer, a target image from the image calibration library;

performing image recognition on the target image through the visual inspection apparatus to obtain a parameter value of the target image;

comparing the parameter value with a calibrated parameter value corresponding to the target image; and in a case that a difference between the parameter value and the calibrated parameter value corresponding to the target image exceeds a fifth parameter threshold range, determining that the visual algorithm is abnormal.

In the technical solutions of the embodiments of this application, a parameter value detected through the improved visual inspection algorithm is compared with the parameter detected through the current visual algorithm, and visual algorithm calibration is implemented based on a comparison result, improving the accuracy of visual algorithm calibration.

In the technical solutions of the embodiments of this application, during system calibration, the calibration member is integrated on the mounting plate, and the mounting plate is driven to move the calibration member. In this way, fully automatic calibration is implemented in an automatic manner, solving the problems of long calibration time and great production capacity loss that are easily caused by less skilled operators.

BRIEF DESCRIPTION OF DRAWINGS

FIG. 6 is a second schematic flowchart of a visual inspection method according to some embodiments of this application;

FIG. 7 is a third schematic flowchart of a visual inspection method according to some embodiments of this application;

FIG. 8 is a first overall schematic flowchart of a visual inspection method according to some embodiments of this application;

FIG. 9 is a fourth schematic flowchart of a visual inspection method according to some embodiments of this application;

FIG. 10 is a fifth schematic flowchart of a visual inspection method according to some embodiments of this application;

FIG. 11 is a sixth schematic flowchart of a visual inspection method according to some embodiments of this application;

FIG. 13 is an eighth schematic flowchart of a visual inspection method according to some embodiments of this application;

FIG. 14 is a ninth schematic flowchart of a visual inspection method according to some embodiments of this application;

FIG. 17 is a tenth schematic flowchart of a visual inspection method according to some embodiments of this application;

FIG. 18 is an eleventh schematic flowchart of a visual inspection method according to some embodiments of this application;

FIG. 19 is a twelfth schematic flowchart of a visual inspection method according to some embodiments of this application;

FIG. 20 is a thirteenth schematic flowchart of a visual inspection method according to some embodiments of this application.

Figure 1:
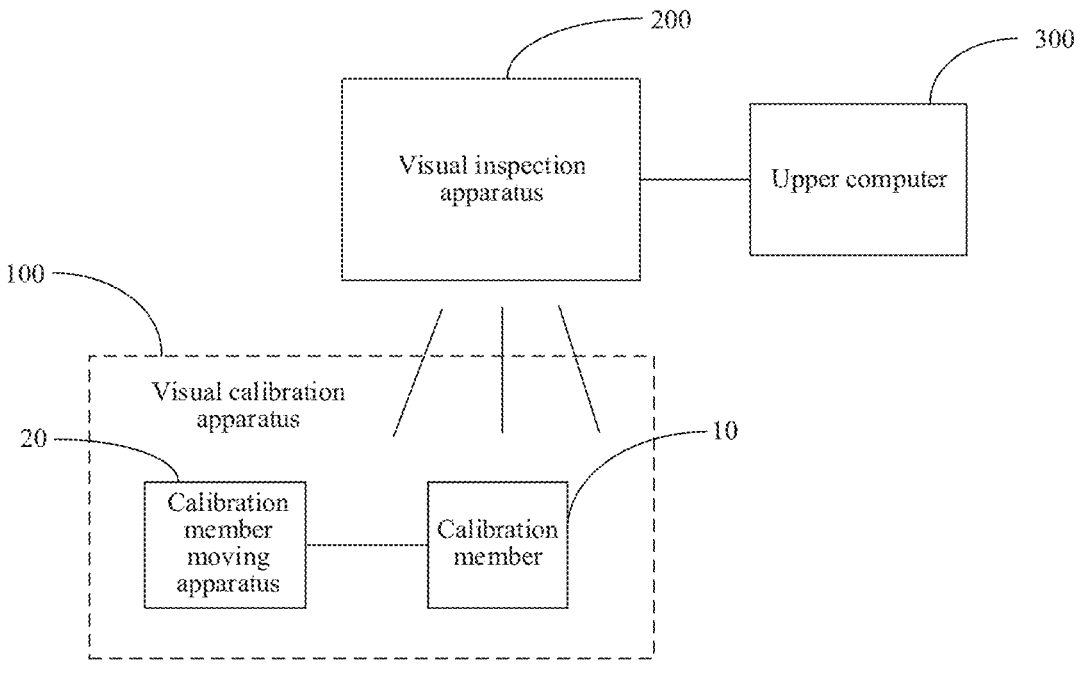
FIG. 1 is a schematic structural diagram of a visual calibration system according to some embodiments of this application.

Reference signs in the specific embodiments are described as follows:

visual calibration apparatus 100; visual inspection apparatus 200; upper computer 300; calibration member 10; calibration member moving apparatus 20; size calibration part 201; color card calibration part 202; plate body 30; calibration surface 40; mounting plate 50; support base 60; driving apparatus 70, 701, 702; sliding rail 80; adapting seat 90; height limiting block 901; first sliding limiting block 902; and second sliding limiting block 903.

EMBODIMENTS OF THE PRESENT INVENTION

The following describes in detail the embodiments of technical solutions in this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In a chip production line, spot inspection of equipment is a process used to check and evaluate the condition of production equipment so as to ensure normal operation and product quality of the production equipment. The spot inspection of equipment in the chip production line is typically required to be stricter and more meticulous. This is because chip production requires extremely high accuracy, stability, and purity of the equipment.

General steps of the spot inspection of equipment in the chip production line are as follows. Cleaning and preparation: Before the spot inspection, clean the equipment first and keep the working region clean and tidy. In addition, prepare the required spot inspection tools, record forms, and documents. Appearance inspection: Carefully inspect the appearance of the equipment, including checking whether there is damage, corrosion, and dirt on the surface of the equipment. Ensure that mechanical components and interfaces of the equipment are connected securely to prevent looseness or air leakage. Function testing: Test functions of the equipment, including starting, operating, and stopping the equipment. Check whether the equipment operates properly according to predetermined parameters and procedures. Ensure that all functions can be accurately executed. Temperature and humidity control: Accurate control of temperature and humidity is crucial in the chip production process.

Ensure that temperature and humidity control systems of the equipment operate properly and meet the production requirements.

Sensor inspection and calibration: Chip production equipment is typically equipped with a large number of sensors to monitor various parameters such as temperature, pressure, and flow. Check accuracy of these sensors and perform calibration and adjustment. Inspection and replacement of consumables: The chip production equipment typically uses various consumables such as filters and seals. Check conditions of these consumables, and perform timely replacement when needed, so as to ensure normal operation of the equipment and keep the purity in the production process. Recording and reporting: In the spot inspection process, record inspection results, observed problems, and actions taken. Report any observed serious problems promptly and take appropriate corrective measures.

In the chip production line, the spot inspection of equipment is crucial as it helps to ensure the accuracy, stability, and reliability of the equipment, thereby ensuring high quality and product performance in the chip production process. Regular spot inspection of equipment is also a critical task in managing and maintaining the chip production equipment, and under normal circumstances, the spot inspection of equipment can be performed using a visual system in combination with a spot inspection block.

In the chip production line, the occasion of the spot inspection of equipment is typically based on the following factors. Regular spot inspection: Regular spot inspection is performed at predetermined time intervals, for example, being performed once a day, a week, or a month. Such spot inspection can ensure stability and reliability of the equipment and early detect potential problems. Preventive spot inspection: Preventive spot inspection is performed during normal operation of the equipment to prevent the problems that may lead to failures or damages. Such spot inspection can reduce failures and downtime of the equipment, improving the production efficiency. Accidental spot inspection: Accidental spot inspection is performed when abnormal situations or equipment problems occur. Such spot inspection is intended to identify and solve specific problems in a timely manner and prevent their further deterioration. Critical-stage spot inspection: Critical-stage spot inspection is performed before or after a critical stage or a critical step in the chip production process. This can ensure that the equipment is in good condition at the crucial stage and avoid negative effects on product quality. In addition, the occasion of the spot inspection of equipment can also be determined based on history records, production needs, and operational experience of equipment. It is important to implement a reasonable spot inspection plan to ensure the stability and reliability of equipment at the critical stage and critical step, while minimizing risks and failures in production. Under normal circumstances, a manufacturing execution system creates a calibration task to trigger a visual system to enter automatic calibration mode or sets an automatic calibration time through the equipment to enable calibration mode.

For production line calibration, conventional measurement tool-based calibration is manually operated. Apart from the inconvenience in operation and the need for skilled workers to operate, both operation and analysis are time-consuming, leading to great production capacity loss in the production line.

To solve the technical problem that the existing calibration method is time-consuming, in the embodiments of this application, automated calibration is implemented using a visual calibration apparatus and a calibration member moving apparatus on the visual calibration apparatus, thereby improving the calibration efficiency.

In view of the technical problem that the existing calibration method is time-consuming, this application proposes a visual inspection system. As shown in FIG. 1, the visual inspection system includes:

a visual calibration apparatus 100, including a calibration member 10 and a calibration member moving apparatus 20, where the calibration member moving apparatus 20 includes a movable mounting plate 50, the mounting plate 50 is able to be located at a calibration position within a movement range of the mounting plate 50, the calibration position is located within an inspection range of a visual inspection apparatus 200, and the calibration member 10 is disposed on the mounting plate 50;

the visual inspection apparatus 200, configured to obtain an image of the calibration member 10 and send the image of the calibration member 10 to an upper computer 300; and the upper computer 300, configured to determine, based on the image of the calibration member 10, a systematic calibration result of the visual inspection apparatus 200.

In this embodiment, during battery production, quality monitoring of cells, modules, and packs is increasingly meticulous, so the visual inspection system is provided in each process, and the visual inspection system is used to perform quality monitoring. This embodiment can be applied to various processes of cells, modules, and packs. As long as the visual inspection system is involved, automated inspection can be implemented according to this embodiment. Completion of a welding process of cell is used as an example for illustration. After completion of the welding process of cell, a welded cell is transported to a next process. The visual inspection apparatus 200 is disposed on a transportation line for transporting welded cells, and the visual inspection apparatus 200 is configured to perform visual monitoring on the production line. Therefore, the visual inspection apparatus 200 has a calibration position on the transportation line. When the welded cell reaches the calibration position during transportation, the visual inspection apparatus 200 can capture an image of the welded cell and perform data analysis based on the image of the welded cell. In addition, in this embodiment, in a case that the visual inspection system is in inspection mode, the calibration member 10 on the visual calibration apparatus 100 is moved to the calibration position, and then the visual inspection system performs visual inspection on the calibration position, thereby implementing automated inspection and achieving the purpose of improving the inspection efficiency of the production line.

The visual calibration apparatus 100 may be located on one side of the calibration position. A manufacturing execution system creates a calibration task to trigger a visual system to enter automatic calibration mode or inspection equipment sets an automatic calibration time to enter calibration mode. The upper computer 300 notifies the visual calibration apparatus 100 to enter a calibration mode. The visual calibration apparatus 100 uses the calibration member moving apparatus 20 to move the calibration member 10 to the calibration position for visual inspection. Since the visual inspection apparatus 200 is configured to capture an image of an object being inspected at the calibration position, the visual inspection apparatus 200 can capture an image of the calibration member 10 and send the captured image of the calibration member 10 to the upper computer 300 for image analysis. The upper computer 300 performs systematic calibration based on the image of the calibration member 10 to obtain a systematic calibration result, where the systematic calibration result includes a calibration result indicating whether visual accuracy is abnormal, a calibration result indicating whether an imaging effect is abnormal, and a calibration result indicating whether a visual algorithm is abnormal.

The visual inspection system of this embodiment adapts to different application scenarios of visual inspection devices. The apparatus itself has a function of implementing automatic calibration based on the characteristics of a measured object, capable of automatically implementing online calibration on light source, camera accuracy, and algorithm stability and accuracy of the visual system.

In the technical solution of this embodiment of this application, the calibration member 10 is integrated on the mounting plate 50, and the mounting plate 50 is driven to move the calibration member 10. In this way, fully automatic calibration is implemented in an automatic manner, solving the problems of long calibration time and great production capacity loss that are easily caused by less skilled operators.

In this embodiment, the calibration member moving apparatus 20 is configured to drive a calibration block to move to the calibration position to allow a light source of the visual inspection apparatus 200 to irradiate the calibration member 10. The calibration member moving apparatus 20 is configured to: when calibration is needed, move the calibration member 10 to the light source for visual inspection so as to avoid affecting the normal operation of the production line; and when calibration is not needed, automatically retract the calibration member 10. As shown in FIG. 1 which is a schematic structural diagram of the visual calibration apparatus 100, when calibration is needed, the calibration member 10 on the calibration member moving apparatus 20 is moved to the light source for visual inspection, thereby implementing automated visual inspection.

The calibration position is a position for visual inspection. The visual inspection apparatus 200 includes the light source, a visual inspection member, a processing apparatus, and a control apparatus. The visual inspection member faces the calibration position and is configured to capture an image of a product at the calibration position. The light source provides light for the calibration position. The processing apparatus is configured to obtain a visual image. The control apparatus is configured to control an operation process of the visual inspection apparatus 200 on the production line. The visual inspection is provided at the calibration position, thereby implementing effective control of the production line.

In this embodiment, when systematic calibration needs to be performed through the calibration member 10, the calibration member 10 is automatically moved to the calibration position, thereby implementing fully automatic calibration of the visual inspection apparatus 200.

In this embodiment, the calibration member 10 is integrated on the mounting plate 50, and the mounting plate 50 is driven to move the calibration member 10. In this way, fully automatic calibration is implemented in an automatic manner, solving the problems of long calibration time and great production capacity loss that are easily caused by less skilled operators.

According to some embodiments of this application, optionally, the calibration member 10 is detachably mounted on the mounting plate 50.

In these embodiments, the calibration member 10 is connected to the mounting plate 50 by locking or other manners, which is not limited in these embodiments. The calibration member 10 is detachably mounted on the mounting plate 50, allowing the calibration member 10 on the mounting plate 50 to be replaced based on actual inspection requirements, thereby improving inspection flexibility.

In these embodiments, quick-release locking of the calibration member 10 is implemented through a detachable member on the mounting plate 50 on which the calibration member 10 is mounted, facilitating true value measurement of a measurement system with quadratic or higher accuracy.

According to some embodiments of this application, optionally, the calibration member 10 includes a plurality of size calibration parts with a gradient change in size and a plurality of color card calibration parts with a gradient change in gray value.

The visual inspection apparatus 200 is further configured to obtain a first image of the size calibration part and a second image of the color card calibration part and send the first image and the second image to the upper computer 300.

The upper computer 300 is further configured to determine, based on the first image and/or the second image, the systematic calibration result of the visual inspection apparatus 200.

Figure 2:
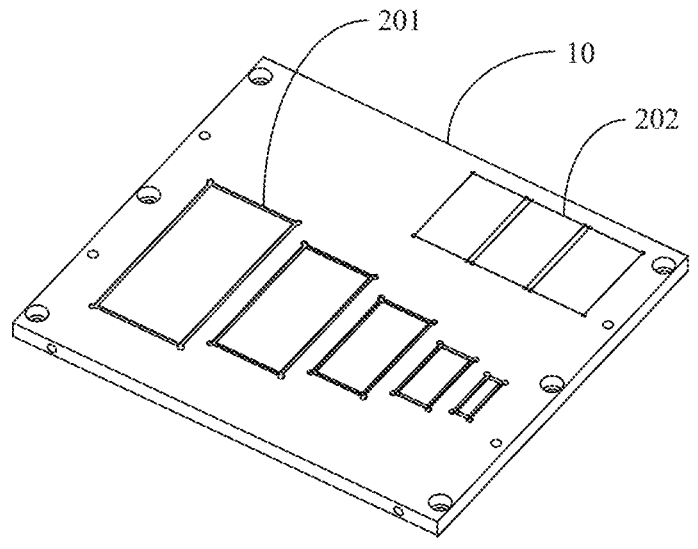
FIG. 2 is a schematic structural diagram of a calibration member according to some embodiments of this application.

As shown in FIG. 2 which is a schematic diagram showing the calibration member 10 and calibration parts in the calibration member 10, the calibration parts include a plurality of size calibration parts 201 with a gradient change in size and a plurality of color card calibration parts 202 with a gradient change in gray value. The size calibration parts may be gradient calibration recesses or protrusions or may be calibration parts in other forms. The calibration member 10 requires that the recesses or protrusions exhibit a periodic pattern in dimensions and cover a measurement range of a measurement tool as much as possible. The calibration member 10 requires that the recesses or protrusions have a non-mirror surface with a frosted texture and a roughness of less than Ra3.2.

In general, for dimension information of the recess, the protrusion, and the like on the calibration member 10, only depth exhibits a gradient change, while width or length does not. This leads to certain contingency in calibration of a 2D camera, making it impossible to effectively calibrate and determine linear displacement of a measurement range of a measurement tool and to discover lens distortion which affects the accuracy. Therefore, in these embodiments, gradient changes in two- and three-dimensional dimensions are added to effectively implement accuracy calibration within measurement ranges of measurement tools including 2D cameras and 3D cameras. This ensures that the linear displacement of the measurement tool is calibrated, and allows for calibration of a distortion-induced accuracy error of a lens of the 2D camera.

In these embodiments, the calibration member 10 is required to have not less than five recesses or protrusions with gradient changes to meet gradient changes in both two- and three-dimensional dimensions, allowing its use for the accuracy calibration within the measurement ranges of the measurement tools including 2D cameras and 3D cameras, and for analysis and calibration of linear displacement of the measurement tools including 2D cameras and 3D cameras.

In a specific implementation, the first image is a captured image of the plurality of size calibration parts with a gradient change in size. The calibration member 10 may alternatively be disposed on a product to obtain an image of the product and implement visual algorithm calibration based on the image of the product. The visual inspection apparatus 200 faces the calibration member 10. In a case that the calibration member 10 is supplemented with light by a light source, the visual inspection apparatus 200 obtains the image of the size calibration part on the calibration member 10. Systematic analysis is performed based on the image of the size calibration part to implement inspection of the visual inspection apparatus 200. The second image is a captured image of the color card calibration part with a gradient change in gray value. The first image and the second image may be one image or a plurality of separate images. In a case that the first image and the second image are a plurality of separate images, visual inspection apparatuses 200 disposed in different regions capture first images and second images of the corresponding regions, or in a case that the first image and the second image are one image, the image may be divided into regions to obtain the first image corresponding to the plurality of size calibration parts with a gradient change in size and the second image corresponding to the plurality of color card calibration parts with a gradient change in gray value, thereby implementing visual inspection.

In these embodiments, the systematic calibration result includes a visual accuracy calibration result, an imaging effect calibration result, and a visual algorithm calibration result, thereby implementing systematic calibration of the visual inspection apparatus 200.

In these embodiments, the calibration member 10 is provided with the plurality of size calibration parts with a gradient change in size, to effectively implement accuracy calibration within measurement ranges of measurement tools including 2D cameras and 3D cameras, thereby ensuring that linear displacement of the measurement tool is calibrated. The linear displacement is a linear error or endpoint linearity that measures the maximum deviation of a straight line formed by endpoints passing through the entire measurement range, or a deviation between an actual measurement curve and an ideal straight line. In addition, a distortion-induced accuracy error of a lens of the 2D camera can be calibrated. On the basis of the accuracy calibration having been implemented, algorithm calibration is further performed, thereby implementing systematic calibration of the visual inspection apparatus 200.

Figure 3:
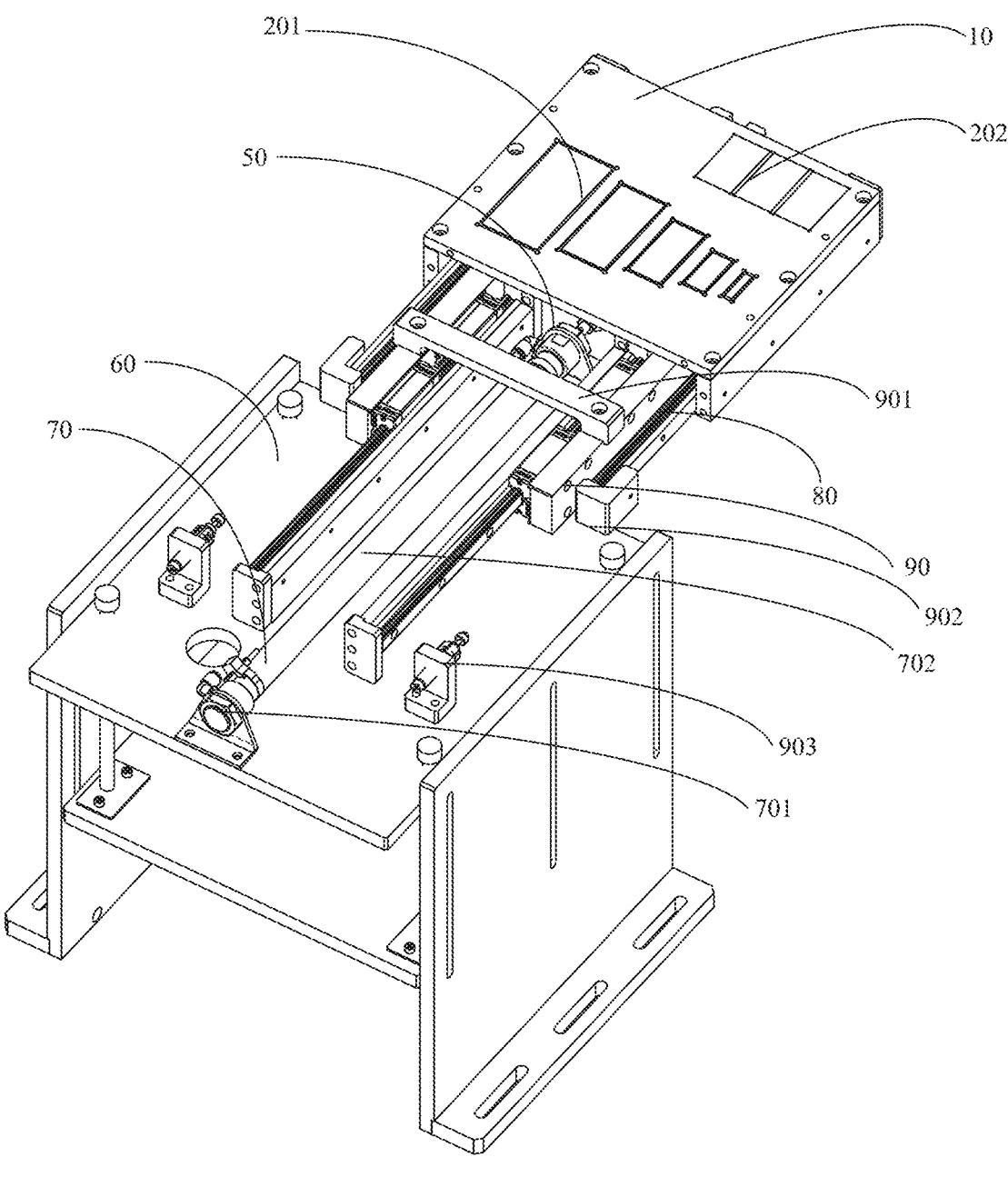
FIG. 3 is a schematic structural diagram of a visual calibration apparatus according to some embodiments of this application.

According to some embodiments of this application, optionally, as shown in FIG. 3, the visual calibration apparatus 100 further includes:

a support base 60; and a driving apparatus 70, including a fixed part 701 and a movable part 702 moving linearly relative to each other, where the fixed part 701 is disposed on the support base 60, and the movable part 702 is connected to the mounting plate 50.

The fixed part 701 is configured to fix the driving apparatus to the support base 60. The fixed part 701 may be a fixed member or may be a fixed component in other forms, which is not limited in these embodiments. The driving apparatus 70 may be a cylinder or another driving apparatus, which is not limited in these embodiments. The movable part 702 may be a telescopic rod of the cylinder, where one end of the telescopic rod is connected to the fixed part, and another end thereof is connected to the mounting plate 50. The mounting plate 50 is moved by the telescopic rod so as to drive the calibration member 10 on the mounting plate 50 to move to the calibration position.

In these embodiments, the driving apparatus 70 does not directly drive the calibration member 10, but drives the mounting plate 50 connected to the calibration member 10 instead. The mounting plate 50 is driven to move the calibration member 10. The mounting plate 50 is connected to the calibration member 10 through the detachable member, allowing the calibration member 10 to be replaced based on requirements, thereby improving visual inspection flexibility.

In a specific implementation, the driving apparatus 70 being a cylinder is used as an example for illustration. One end of the cylinder is connected to the mounting plate 50. The calibration member 10 is mounted on the mounting plate 50 through the detachable member. When receiving an inspection instruction, the cylinder actuates to move the mounting plate 50 connected thereto to the calibration position, so that the calibration member 10 automatically moves to the calibration position. When receiving an inspection complete instruction, the cylinder retracts to move the mounting plate 50 connected thereto back to its original position, with the calibration member 10, so that the calibration member 10 mounted on the mounting plate 50 automatically moves back to its original position.

The driving apparatus 70 may alternatively be directly connected to the calibration member 10. When receiving an inspection instruction, the cylinder actuates to move the calibration member 10 connected thereto to the calibration position, so that the calibration member 10 automatically moves to the calibration position. When receiving an inspection complete instruction, the cylinder retracts to move the calibration member 10 connected thereto back to its original position, so that the calibration member 10 automatically moves back to its original position.

In the technical solutions of the embodiments of this application, the calibration member 10 is driven to move so as to implement fully automatic calibration of the visual inspection apparatus 200.

According to some embodiments of this application, optionally, the visual calibration apparatus 100 further includes a sliding guide structure, where the sliding guide structure includes a sliding rail 80 and a slider (not shown in the figure) in sliding fit with each other. For the sliding rail 80 and the slider, the sliding rail 80 and the slider are disposed between the support base and the mounting plate 50, with one disposed on the support base 60 and the other disposed on the mounting plate 50.

In these embodiments, the sliding guide structure is used in cooperation with a sliding apparatus at the bottom of the mounting plate 50, and the sliding guide structure is used to move the calibration member 10 to the calibration position. The slider is disposed on the support base 60, the sliding rail 80 moves on the slider, and the sliding rail 80 is used in cooperation with the mounting plate 50. When driving the mounting plate 50, the driving apparatus 70 drives the sliding rail 80 to move on the slider, thereby allowing the calibration member 10 on the mounting plate 50 to move to the calibration position.

In these embodiments, under a condition that the driving apparatus 70 drives the mounting plate 50 on which the calibration member 10 is mounted, the sliding apparatus determines a movement trajectory of the mounting plate 50 on which the calibration member 10 is mounted, improving the accuracy of the movement of the calibration member 10.

According to some embodiments of this application, optionally, the visual calibration apparatus 100 further includes an adapting seat 90, the sliding rail is provided in two, and the slider is correspondingly provided in two.

The sliding rail 80 and the slider fitting with each other as one set are disposed between the support base 60 and the adapting seat 90, and the sliding rail 80 and the slider fitting with each other as another set are disposed between the mounting plate 50 and the adapting seat.

In these embodiments, as shown in FIG. 3, two rails are provided. The sliding rail 80 and the slider fitting with each other as a first set are disposed on a side of the driving apparatus 70 close to the calibration block. The sliding rail 80 and the slider in the first set control the calibration block to move within a first movement range. The sliding rail 80 and the slider fitting with each other as a second set are disposed on a side far away from the calibration block. The sliding rail 80 and the slider in the second set control the calibration block to move within a second movement range. The sliding rail 80 and the slider fitting with each other as the first set move the calibration block to the calibration position. The sliding rail 80 and the slider fitting with each other as the second set enable the calibration block to retract to the support base 60.

In these embodiments, a plurality of sets of sliding apparatuses are used to move the mounting plate 50, thereby implementing accurate control of the movement of the mounting plate 50.

The adapting seat is also provided with a height limiting block 901 and a first sliding limiting block 902. The height limiting block 901 is configured to limit the height of a sliding trajectory so as to limit a sliding range of the mounting plate 50 in a vertical direction. The first sliding limiting block 902 is configured to limit a sliding range of the sliding rail in a horizontal direction within the first movement range. The visual calibration apparatus 100 further includes a second sliding limiting block 903. The second sliding limiting block 903 is fixed to the support base 60 and configured to limit a sliding range of the sliding rail in a horizontal direction within the second movement range.

Figure 4:
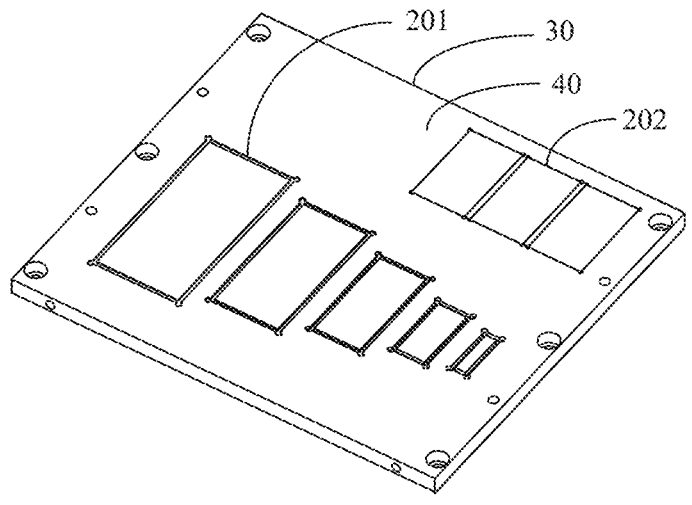
FIG. 4 is another schematic structural diagram of a calibration member according to some embodiments of this application.

According to some embodiments of this application, optionally, as shown in FIG. 4, the calibration member 10 for visual calibration includes:

a plate body 30 having a calibration surface 40; and a plurality of size calibration parts 201 spaced apart on the calibration surface 40 in a linear direction, where the plurality of size calibration parts each have a length dimension in a first direction and a width dimension in a second direction, with the length dimensions of the plurality of size calibration parts exhibiting a gradient change and/or the width dimensions of the plurality of size calibration parts exhibiting a gradient change, where the first direction and the second direction are directions perpendicular to each other in a horizontal plane.

In these embodiments, the calibration member 10 includes a calibration block or may be a calibration member 10 in other forms, which is not limited in these embodiments. The calibration member 10 being the calibration block is used as an example for illustration. The first direction may be a horizontal direction along the plate body 30, that is, an x-axis direction, and the second direction may be a vertical direction along the plate body 30, that is, a y-axis direction. Alternatively, the first direction may be a vertical direction along the plate body 30, and the second direction may be a horizontal direction along the plate body 30. This is not limited in these embodiments.

In a specific implementation, of any two adjacent size calibration parts, the size calibration part in the front has a length dimension greater than or less than that of the size calibration part in the rear; and/or of any two adjacent size calibration parts, the size calibration part in the front has a width dimension greater than or less than that of the size calibration part in the rear. The first direction and the second direction are directions perpendicular to each other in a horizontal plane, so that the length or width dimensions exhibit a linear change, thereby implementing calibration of linear displacement.

In a direction along which the plurality of size calibration parts are spaced apart, of any three adjacent size calibration parts, two adjacent size calibration parts in the front have the same length dimension variation as that of two adjacent size calibration parts in the rear, and/or two adjacent size calibration parts in the front have the same width dimension variation as that of two adjacent size calibration parts in the rear. In this way, the length or width dimensions exhibit a gradient change, improving calibration accuracy of linear displacement.

In these embodiments, the size calibration part and the plate body 30 may be integrally formed or separately disposed, which is not limited in these embodiments.

In these embodiments, the calibration member 10 is provided with the plurality of size calibration parts with a gradient change in size, to effectively implement accuracy calibration within measurement ranges of measurement tools including 2D cameras and 3D cameras, thereby ensuring that linear displacement of the measurement tool is calibrated. The linear displacement is a linear error or endpoint linearity that measures the maximum deviation of a straight line formed by endpoints passing through the entire measurement range, or a deviation between an actual measurement curve and an ideal straight line. In addition, a distortion-induced accuracy error of a lens of the 2D camera can be calibrated, improving the accuracy of visual inspection.

According to some embodiments of this application, optionally, the size calibration part includes a protrusion or recess formed on the plate body.

In these embodiments, the size calibration part is provided with the protrusion or recess. Therefore, based on addition of two dimensions and three dimensions, visual accuracy calibration is performed. In addition, the dimensions exhibit a gradient change, effectively implementing accuracy calibration within measurement ranges of measurement tools including 2D cameras and 3D cameras. This ensures that the linear displacement of the measurement tool is calibrated, and allows for calibration of a distortion-induced accuracy error of a lens of the 2D camera.

In these embodiments, dimension information of the protrusion or recess on the calibration member 10 is obtained to determine whether an error between such dimension information and predetermined dimension information is within a reasonable error range, so as to achieve the accuracy calibration of the camera.

According to some embodiments of this application, optionally, dimensions of the plurality of size calibration parts in a third direction exhibit a gradient change. The third direction is perpendicular to the first direction and the second direction.

In these embodiments, the third direction is a z-axis direction along the plate body 30. In other words, the dimensions of the size calibration parts in the z-axis direction exhibit a gradient change.

In these embodiments, the calibration member 10 is provided with the plurality of size calibration parts with a gradient change in size, to effectively implement accuracy calibration within measurement ranges of measurement tools including 2D cameras and 3D cameras, thereby ensuring that linear displacement of the measurement tool is calibrated.

According to some embodiments of this application, optionally, color card calibration parts 202 with a gradient change in gray value, disposed on the calibration surface 40 of the plate body 30, are further included.

In these embodiments, the color card calibration part 202 may be a colourimetric card or a color card in other forms, which is not limited in these embodiments. The colourimetric card includes a standard color card with a plurality of gradients. The colourimetric card may be a standard color card with three gradients: light gray, gray, and dark gray, or may be an RGB primary color card. A black and white camera is equipped with a standard color card with three gradients: light gray, gray, and dark gray, and a color camera is equipped with an RGB primary color card, implementing imaging effect calibration.

In these embodiments, the calibration member 10 is provided with the colourimetric card to implement imaging effect calibration. For the color card of the calibration member 10, the black and white camera is required to be equipped with a standard color card with three gradients: light gray, gray, and dark gray, thereby implementing imaging effect calibration of the black and white camera.

According to some embodiments of this application, optionally, the color card calibration part 202 includes a three-primary-color card.

In these embodiments, the color camera is equipped with an RGB primary color card, thereby implementing imaging effect calibration of the color camera.

According to some embodiments of this application, optionally, a material of the plate body 30 includes aluminum alloy; and/or roughness of the calibration surface 40 of the plate body 30 is less than a preset roughness threshold.

In these embodiments, the calibration block in the visual inspection system includes an aluminum-white substrate, such as an aluminum alloy material, gradient calibration recesses or protrusions, a standard color card with gradients, a cylinder required for moving the calibration block, a sliding rail 80, and a slider. The preset roughness threshold may be Ra3.2 or another threshold, which is not limited in these embodiments. The calibration block requires that the recesses or protrusions exhibit a periodic pattern in dimensions and cover a measurement range of a measurement tool as much as possible. In addition, the calibration block requires that the recesses or protrusions have a non-mirror surface with a frosted texture and a roughness of less than Ra3.2, thereby obtaining a better imaging effect.

In these embodiments, the material of the plate body 30 includes aluminum alloy, and the roughness of the calibration surface 40 of the plate body 30 is adjusted, thereby improving the imaging effect of the plurality of size calibration parts with a gradient change in size and the plurality of color card calibration parts 202 with a gradient change in gray value.

This application further proposes a visual inspection method, where a visual inspection system includes a visual inspection apparatus, a visual calibration apparatus, and an upper computer. As shown in FIG. 1, the visual calibration apparatus includes a calibration member and a calibration member moving apparatus, where the calibration member moving apparatus includes a movable mounting plate, the mounting plate is able to be located at a calibration position within a movement range of the mounting plate, the calibration position is located within an inspection range of the visual inspection apparatus, and the calibration member is disposed on the mounting plate.

Figure 5:
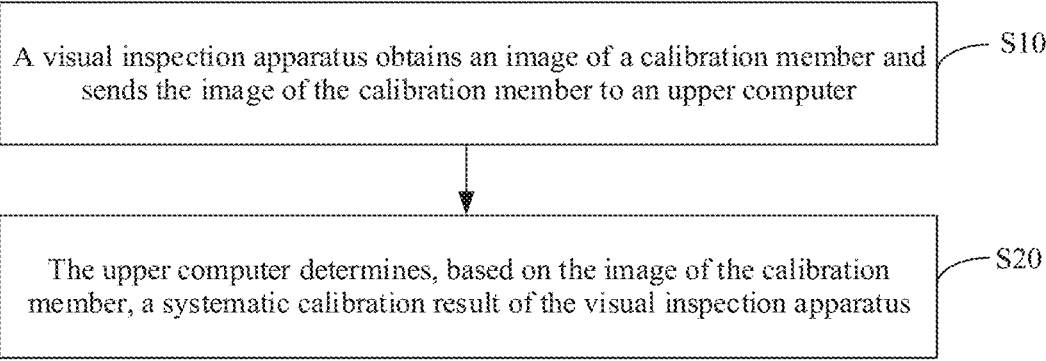
FIG. 5 is a first schematic flowchart of a visual inspection method according to some embodiments of this application.

As shown in FIG. 5 which is a schematic flowchart of the visual inspection method according to a first embodiment, the visual inspection method includes the following steps.

Step S10: The visual inspection apparatus obtains an image of the calibration member and sends the image of the calibration member to the upper computer.

Step S20: The upper computer determines, based on the image of the calibration member, a systematic calibration result of the visual inspection apparatus.

It should be noted that the visual calibration apparatus may be located on one side of the calibration position. A manufacturing execution system creates a calibration task to trigger a visual system to enter automatic calibration mode or inspection equipment sets an automatic calibration time to enter calibration mode. The upper computer notifies the visual calibration apparatus to enter calibration mode. The visual calibration apparatus moves the calibration member through the calibration member moving apparatus to the calibration position for visual inspection. Since the visual inspection apparatus is configured to capture an image of an object being inspected at the calibration position, the visual inspection apparatus can capture an image of the calibration member and send the captured image of the calibration member to the upper computer for image analysis. The upper computer performs systematic calibration based on the image of the calibration member to obtain a systematic calibration result, where the systematic calibration result includes a calibration result indicating whether visual accuracy is abnormal, a calibration result indicating whether an imaging effect is abnormal, and a calibration result indicating whether a visual algorithm is abnormal.

The visual inspection system of this embodiment adapts to different application scenarios of visual inspection devices. The apparatus itself has a function of implementing automatic calibration based on the characteristics of a measured object, capable of automatically implementing online calibration on light source, camera accuracy, and algorithm stability and accuracy of the visual system.

In the technical solution of this embodiment of this application, the calibration member is integrated on the mounting plate, and the mounting plate is driven to move the calibration member. In this way, fully automatic calibration is implemented in an automatic manner, solving the problems of long calibration time and great production capacity loss that are easily caused by less skilled operators.

In this embodiment, the calibration member moving apparatus is configured to drive a calibration block to move to the calibration position to allow a light source of the visual inspection apparatus to irradiate the calibration member. The calibration member moving apparatus is configured to: when calibration is needed, move the calibration member to the light source for visual inspection so as to avoid affecting the normal operation of the production line; and when calibration is not needed, automatically retract the calibration member. When calibration is needed, the calibration member on the calibration member moving apparatus is moved to the light source for visual inspection, thereby implementing automated visual inspection.

The calibration position is a position for visual inspection. The visual inspection apparatus includes the light source, a visual inspection member, a processing apparatus, and a control apparatus. The visual inspection member faces the calibration position and is configured to capture an image of a product at the calibration position. The light source provides light for the calibration position. The processing apparatus is configured to obtain a visual image. The control apparatus is configured to control an operation process of the visual inspection apparatus on the production line. The visual inspection is provided at the calibration position, thereby implementing effective control of the production line.

In this embodiment, when systematic calibration needs to be performed through the calibration member, the calibration member is automatically moved to the calibration position, thereby implementing fully automatic calibration of the visual inspection apparatus.

In this embodiment, the calibration member is integrated on the mounting plate, and the mounting plate is driven to move the calibration member. In this way, fully automatic calibration is implemented in an automatic manner, solving the problems of long calibration time and great production capacity loss that are easily caused by less skilled operators.

According to some embodiments of this application, optionally, as shown in FIG. 6 which is a schematic flow-chart of a visual inspection method according to a second embodiment, the calibration member includes a plurality of size calibration parts with a gradient change in size and a plurality of color card calibration parts with a gradient change in gray value.

Step S10': The visual inspection apparatus is configured to obtain a first image of the size calibration part and a second image of the color card calibration part and send the first image and the second image to the upper computer.

Step S20': The upper computer is configured to determine, based on the first image and/or the second image, the systematic calibration result of the visual inspection apparatus.

In general, a product imitation calibration member is designed and manually placed on an inspection position for object under test to match an inspection posture in an actual production process. Then, a camera captures dimension information of the recess, the protrusion, and the like on the calibration member to determine whether an error between such dimension information and predetermined dimension information is within a reasonable error range, so as to achieve the accuracy calibration of the camera. This calibration method is specific only to the accuracy calibration of the camera, thus limiting the calibration method.

To solve the technical problem that the existing calibration method is limited, in this embodiment of this application, the calibration member is provided with the plurality of size calibration parts with a gradient change in size, to effectively implement accuracy calibration within measurement ranges of measurement tools including 2D cameras and 3D cameras, thereby ensuring that linear displacement of the measurement tool is calibrated. The linear displacement is a linear error or endpoint linearity that measures the maximum deviation of a straight line formed by endpoints passing through the entire measurement range, or a deviation between an actual measurement curve and an ideal straight line. In addition, a distortion-induced accuracy error of a lens of the 2D camera can be calibrated. On the basis of the accuracy calibration having been implemented, algorithm calibration is further performed, thereby implementing systematic calibration of the visual inspection apparatus.

It should be noted that to facilitate real-time monitoring of a product on the production line, an image of the product on the production line is captured by the visual inspection apparatus, and the image is analyzed to obtain the specifications and relevant parameters of the product, such as the size and thickness of the product, thereby implementing effective monitoring of the product. The product may be a battery cell, a battery pack, or the like, or may be a product of another type, which is not limited in this embodiment. In this embodiment, the product being a battery cell is used as an example for illustration. A plurality of inspection positions are provided on a production line for production and processing of battery cells. The visual inspection apparatus is provided at the inspection position, and the visual inspection apparatus may be a 2D camera, a 3D camera, a structural camera, an area scan camera, a line scan camera, a light source, or the like. The visual inspection apparatus faces the calibration member to capture its image. The light source is further disposed to provide light irradiation for the calibration member, helping the visual inspection apparatus to capture the image of the calibration member. The calibration member may be placed on a transportation line, so that the visual inspection apparatus captures the image of the calibration member upon detection of the calibration member; the calibration member may alternatively be disposed on the side of the transportation line, so that when calibration is needed, the calibration member is automatically placed on the transportation line; or the calibration member may alternatively be moved to the inspection position by a driving apparatus. This is not limited in this embodiment.

The visual calibration apparatus includes the calibration member. The calibration member is used as a sample. The image of the calibration member is captured for implementing systematic inspection of the visual inspection apparatus. As shown in FIG. 2 which is a schematic diagram showing the calibration member and calibration parts in the calibration member, the calibration parts include a plurality of size calibration parts with a gradient change in size and a plurality of color card calibration parts with a gradient change in gray value. The size calibration parts may be gradient calibration recesses or protrusions, or may be calibration parts in other forms. The calibration member requires that the recesses or protrusions exhibit a periodic pattern in dimensions and cover a measurement range of a measurement tool as much as possible. The calibration member requires that the recesses or protrusions have a non-mirror surface with a frosted texture and a roughness of less than Ra3.2.

In general, for dimension information of the recess, the protrusion, and the like on the calibration member, only depth exhibits a gradient change, while width or length does not. This leads to certain contingency in calibration of a 2D camera, making it impossible to effectively calibrate and determine linear displacement of a measurement range of a measurement tool and to discover lens distortion which affects the accuracy. Therefore, in this embodiment, gradient changes in two- and three-dimensional dimensions are added to effectively implement accuracy calibration within measurement ranges of measurement tools including 2D cameras and 3D cameras. This ensures that the linear displacement of the measurement tool is calibrated, and allows for calibration of a distortion-induced accuracy error of a lens of the 2D camera.

In this embodiment, the calibration member is required to have not less than five recesses or protrusions with gradient changes, to meet gradient changes in both two- and three-dimensional dimensions, allowing its use for the accuracy calibration within the measurement ranges of the measurement tools including 2D cameras and 3D cameras, and for analysis and calibration of linear displacement of the measurement tools including 2D cameras and 3D cameras.

In a specific implementation, the first image is a captured image of the plurality of size calibration parts with a gradient change in size. The calibration member may alternatively be disposed on a product to obtain an image of the product and implement visual algorithm calibration based on the image of the product. The visual inspection apparatus faces the calibration member. In a case that the calibration member is supplemented with light by a light source, the visual inspection apparatus obtains the image of the size calibration part on the calibration member. Systematic analysis is performed based on the image of the size calibration part to implement inspection of the visual inspection apparatus. The second image is a captured image of the color card calibration part with a gradient change in gray value. The first image and the second image may be one image or a plurality of separate images. In a case that the first image and the second image are a plurality of separate images, visual inspection apparatuses disposed in different regions capture first images and second images of the corresponding regions, or in a case that the first image and the second image are one image, the image may be divided into regions to obtain the first image corresponding to the plurality of size calibration parts with a gradient change in size and the second image corresponding to the plurality of color card calibration parts with a gradient change in gray value, thereby implementing visual inspection.

The calibration member may alternatively be disposed on a product to obtain an image of the product and implement visual algorithm calibration based on the image of the product. The visual inspection apparatus faces the calibration member. In a case that the calibration member is supplemented with light by a light source, the visual inspection apparatus obtains the image of the size calibration part on the calibration member. Systematic analysis is performed based on the image of the size calibration part to implement inspection of the visual inspection apparatus.

In this embodiment, the systematic calibration result includes a visual accuracy calibration result, an imaging effect calibration result, and a visual algorithm calibration result, thereby implementing systematic calibration of the visual inspection apparatus.

In this embodiment, the calibration member is provided with the plurality of size calibration parts with a gradient change in size, to effectively implement accuracy calibration within measurement ranges of measurement tools including 2D cameras and 3D cameras, thereby ensuring that linear displacement of the measurement tool is calibrated. The linear displacement is a linear error or endpoint linearity that measures the maximum deviation of a straight line formed by endpoints passing through the entire measurement range, or a deviation between an actual measurement curve and an ideal straight line. In addition, a distortion-induced accuracy error of a lens of the 2D camera can be calibrated. On the basis of the accuracy calibration having been implemented, algorithm calibration is further performed, thereby implementing systematic calibration of the visual inspection apparatus.

It should be noted that in a case that any one of the visual accuracy calibration result, the imaging effect calibration result, and the visual algorithm calibration result is an abnormal result, equipment to be inspected is notified to stop operating.

In this embodiment, various parameters and comparison results obtained are uploaded to the manufacturing execution system. The manufacturing execution system compares the structural parameters again. If any one of the results is NG, the manufacturing execution system locks the system, preventing the inspection system from operation. In addition, the equipment gives an alarm, and an operator needs to conduct system troubleshooting and adjustment based on the NG items and correct visual inspection errors in a timely manner. To ensure that the visual inspection system still has good accuracy after a long time or after adjustment, for example, in a case that abnormal visual accuracy has been detected, the manufacturing execution system locks the system, or in case of abnormal imaging effect or abnormality in the visual algorithm, the system is shut down for rectification, thereby improving effective monitoring of production.

In this embodiment, to ensure production safety of a production line and prevent delivery of defective products, the production line is shut down for inspection in a timely manner when visual accuracy, visual imaging, and visual algorithm problems are detected on the production line, implementing effective control of monitoring of the production line.

In a case that the systematic calibration result is a normal result, it is determined that calibration mode ends, and relevant production equipment is notified to enter production mode.

In this embodiment, in a case that the visual accuracy calibration result, the imaging effect calibration result, and the visual algorithm calibration result are all normal, the visual inspection apparatus interacts with an upstream workstation to notify the upstream workstation to start material feeding and enter the production mode, thereby implementing automated management of production.

In this embodiment, in a production calibration process, to avoid other materials during calibration and other influencing factors in the production process, it is necessary to suspend material delivery to the production line and enable the production line to enter the calibration mode. However, at the end of calibration, it is necessary to resume production as soon as possible and enable the production line to automatically recover the production mode, thereby improving the automated management of the production line.

According to some embodiments of this application, optionally, as shown in FIG. 7, the visual inspection method further includes the following steps.

Step S401: In a case of having received a calibration instruction, the upper computer sends the calibration instruction to the visual inspection apparatus.

Step S402: In a case of having received the calibration instruction, the visual inspection apparatus notifies a workstation controller to stop material delivery.

As shown in FIG. 8 which is an overall schematic flowchart of visual inspection method, the manufacturing execution system creates a calibration task or the equipment sets an automatic calibration time, which triggers the visual inspection apparatus to enter automatic calibration mode. The visual inspection apparatus interacts with the upstream workstation to notify the upstream workstation to stop material feeding and enter the calibration mode. The specific procedures are as follows. S301: It is determined whether a material is present at the calibration position, and if not, S302 is performed: The calibration block moves to the calibration position, a camera shoots to obtain an image, and the image is analyzed. S303: After the image is obtained, the cylinder controls the calibration block to return to its original position. S304: Camera accuracy determination: |measurement value-standard value|<T/10; imaging effect calibration: |measurement value-standard value|<10, and if both results are OK, S305 is performed: Algorithm calibration: |measurement value-standard value|<T/10. If the result is OK, S306 is performed: A result is uploaded to the manufacturing execution system, and the visual system notifies upstream to start material feeding and enter production mode. If one of the camera accuracy or the imaging effect fails, or the algorithm calibration fails, S308 is performed: The result is uploaded to the manufacturing execution system, the equipment is shut down, and an alarm is given. S309: An operator conducts system troubleshooting and corrects system errors, and the procedure returns to S302. If a material is present at the calibration position, S307 is performed: Product inspection is performed, and calibration is performed upon completion of the product inspection.

In these embodiments, in a production calibration process, to avoid other materials during calibration and other influencing factors in the production process, material delivery to the production line is suspended, thereby improving the accuracy of calibration.

According to some embodiments of this application, optionally, as shown in FIG. 9, the visual inspection method further includes the following steps.

Step S501: In a case of having detected that no material is present at the calibration position, the visual inspection apparatus notifies a driving apparatus in the visual calibration apparatus to move the calibration member to the calibration position, where the calibration position is located within the inspection range of the visual inspection apparatus, to allow the light source in the visual inspection apparatus to irradiate the calibration member.

In these embodiments, the driving apparatus may be a cylinder or an apparatus capable of implementing a driving function, which is not limited in these embodiments. The driving apparatus being a cylinder is used as an example for illustration. The visual inspection apparatus determines, through sensing by a sensor, that no product is present at the calibration position, and controls the cylinder to extend so as to move the calibration member to a waiting position.

In these embodiments, the driving apparatus moves the calibration member to the calibration position, without requiring manual operation on the calibration member. In this way, fully automatic calibration is implemented, solving the problems of long calibration time and great production capacity loss that are easily caused by less skilled operators.

Step S502: In a case of having detected that a material is present at the calibration position, the visual inspection apparatus keeps inspecting the current material at the calibration position until a target material leaves the calibration position, and notifies the driving apparatus in the visual calibration apparatus to move the calibration member to the calibration position to allow the light source in the visual inspection apparatus to irradiate the calibration member.

In these embodiments, the target material is the last material in the current transportation process. In automatic calibration mode, under a condition that a material is still detected at the calibration position, to complete the current process, calibration is started only when the last product has been detected. For example, the visual inspection apparatus determines, through the sensor, whether a material is present at the calibration position. If a material is present at the calibration position, inspection is performed on the last product. If no material is present at the calibration position, calibration is started.

In these embodiments, the visual inspection apparatus determines, through the sensor, whether a material is present at the calibration position, and inspects the last product if a material is present at the calibration position, thereby implementing fully automatic calibration and improving the calibration efficiency.

According to some embodiments of this application, optionally, as shown in FIG. 10, the visual inspection method further includes the following steps.

Step S601: In a case of having detected the first image and/or the second image, the visual inspection apparatus notifies the driving apparatus in the visual calibration apparatus to move the calibration member back to its original position.

In a specific implementation, after the image of the calibration member has been obtained, the cylinder is triggered and controlled to retract to its original position so as to move the calibration member back to its original position.

In these embodiments, after obtaining a calibration image, the driving apparatus automatically moves the calibration member back to its original position, without requiring manual operation on the calibration member. In this way, fully automatic calibration is implemented, solving the problems of long calibration time and great production capacity loss that are easily caused by less skilled operators.

According to some embodiments of this application, optionally, as shown in FIG. 11, the visual inspection method further includes the following steps.

Step S701: In a case that the systematic calibration result is normal, the upper computer notifies the workstation controller to start material delivery.

Step S702: In a case that the systematic calibration result is abnormal, the upper computer notifies all inspection devices to perform shutdown inspection, and gives an alarm.

In the technical solutions of these embodiments of this application, the upper computer controls the production line based on the systematic calibration result; in a case that the systematic calibration result is normal, notifies the workstation controller to start material delivery, thereby improving the processing efficiency of the production line; or in a case that the systematic calibration result is abnormal, notifies all inspection devices to perform shutdown inspection, and gives an alarm, thereby improving effective monitoring of the production line.

Figure 12:
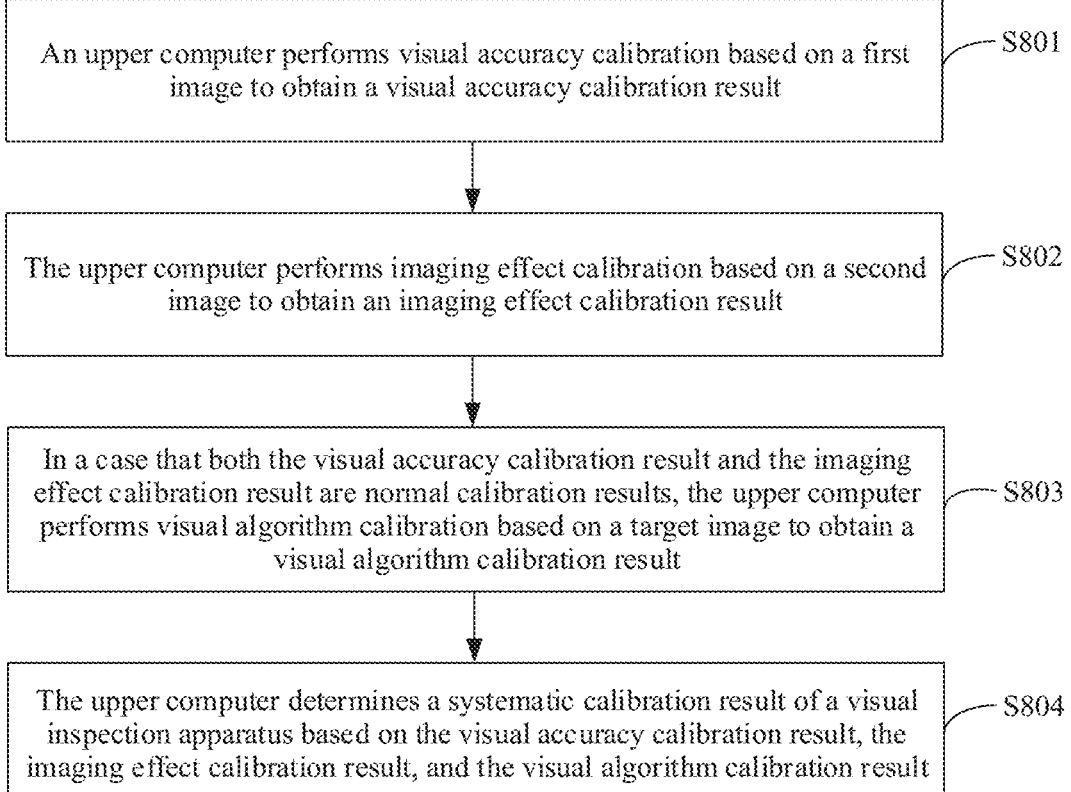
FIG. 12 is a seventh schematic flowchart of a visual inspection method according to some embodiments of this application.

According to some embodiments of this application, optionally, as shown in FIG. 12, the visual inspection method further includes the following steps.

Step S801: The upper computer performs visual accuracy calibration based on the first image to obtain a visual accuracy calibration result.

Step S802: The upper computer performs imaging effect calibration based on the second image to obtain an imaging effect calibration result.

Step S803: In a case that both the visual accuracy calibration result and the imaging effect calibration result are normal calibration results, the upper computer performs visual algorithm calibration based on a target image to obtain a visual algorithm calibration result.

Step S804: The upper computer determines the systematic calibration result of the visual inspection apparatus based on the visual accuracy calibration result, the imaging effect calibration result, and the visual algorithm calibration result.

In these embodiments, the visual accuracy calibration may be calibration of shooting accuracy of the visual inspection apparatus. The size of the calibration member collected by the visual inspection apparatus may be compared with the size of an actual calibration member to obtain the visual accuracy calibration result. For example, the size of the size calibration part on the calibration member, obtained after analysis of the first image, is 10 mm, but the size of the actual size calibration part is 9 mm. In this way, the visual accuracy calibration is implemented based on the size calibration part in the first image, effectively implementing accuracy calibration within measurement ranges of measurement tools including 2D cameras and 3D cameras. This ensures that the linear displacement of the measurement tool is calibrated, and allows for calibration of a distortion-induced accuracy error of a lens of the 2D camera, implementing accuracy calibration.

The color card calibration part may be a colourimetric card. The colourimetric card may be a standard color card with three gradients: light gray, gray, and dark gray, or may be an RGB primary color card. A black and white camera is equipped with a standard color card with three gradients: light gray, gray, and dark gray, and a color camera is equipped with an RGB primary color card, implementing imaging effect calibration. For example, a gray value of a colourimetric card on the calibration member, 50, is obtained after analysis of a colourimetric card of the first image, but a gray value of an actual colorimetric color card is 60. In this way, imaging effect calibration is implemented based on the colourimetric card of the first image.

A target image is an image that is taken from an image calibration library and has been calibrated through a normal visual algorithm, or may be an image that is directly inputted and has been calibrated through the normal visual algorithm. The target image is recognized through a current visual algorithm to obtain a recognition result, and then the recognition result is compared with a result that has been calibrated through the normal visual algorithm, so as to determine whether the current visual algorithm is normal.

In a case that both the visual accuracy calibration result and the imaging effect calibration result are normal calibration results, visual algorithm calibration is performed to achieve the systematic calibration result of the visual inspection apparatus.

In these embodiments, the systematic calibration result of the visual inspection apparatus may alternatively be determined based on an inspection value and standard value corresponding to the first image. A comparison is made to obtain a difference between the inspection value and the standard value, so as to implement systematic calibration of the visual inspection apparatus. For example, during visual accuracy inspection, the inspection value may be a measurement value of a structural parameter, and the standard value may be a parameter value of an actual inspection target, so that a comparison is made therebetween to implement visual accuracy calibration. During imaging effect inspection, the inspection value may be a gray value of the colourimetric card, and the standard value may be a gray value of the actual inspection target, so that a comparison is made therebetween to implement imaging effect calibration. During visual algorithm inspection, the inspection value may be a measurement value obtained through analysis of the structural parameter by the current visual algorithm, and the standard value may be a parameter value obtained through analysis by a good visual algorithm, so that a comparison is made therebetween to implement visual algorithm calibration.

In these embodiments, the inspection value is compared with the standard value to obtain the systematic calibration result of the visual inspection apparatus. In this way, the systematic calibration result of the visual inspection apparatus is achieved through quantitative data, thereby improving the accuracy of systematic calibration of the visual inspection apparatus.

In these embodiments, the systematic calibration result of the visual inspection apparatus may alternatively be determined based on the second image.

In these embodiments, in addition to the size calibration part, the colourimetric card is also provided on the calibration member. The size calibration part can perform visual accuracy calibration, and the colourimetric card can perform imaging effect calibration. Therefore, the visual accuracy, imaging effect, and visual algorithm can all be calibrated, thereby implementing the systematic calibration of the visual inspection apparatus.

In these embodiments, the size calibration part on the calibration member is used to capture an image so as to obtain the visual accuracy calibration result. The colourimetric card on the calibration member is used to perform imaging effect inspection, and visual algorithm inspection is also performed. In this way, the systematic calibration of the visual inspection apparatus is implemented.

A comparison may be made between the inspection value and the standard value to implement systematic calibration of the visual inspection apparatus. For example, during visual accuracy inspection, the inspection value may be the measurement value of the structural parameter, and the standard value may be the parameter value of the actual inspection target, so that a comparison is made therebetween to implement visual accuracy calibration. During imaging effect inspection, the inspection value may be the gray value of the colourimetric card, and the standard value may be the gray value of the actual inspection target, so that a comparison is made therebetween to implement calibration of the imaging effect. During performing visual algorithm, the inspection value may be the measurement value obtained through analysis of the structural parameter using the current visual algorithm, and the standard value may be the parameter value obtained through analysis using the good visual algorithm, so that a comparison is made therebetween to implement calibration of the visual algorithm.

In these embodiments, the measurement value corresponding to the structural parameter is compared with the standard value to obtain the visual accuracy calibration result, and the gray value of the colourimetric card is compared with the standard value to obtain the imaging effect calibration result, so that the systematic calibration of the visual inspection apparatus is implemented through quantitative data, thereby improving the accuracy of systematic calibration.

In a specific implementation, the systematic calibration result of the visual inspection apparatus is determined based on the inspection value and standard value corresponding to the first image and the inspection value and standard value corresponding to the second image.

In these embodiments, a comparison is made between the inspection value and standard value of the structural parameter of the image of the plurality of size calibration parts with a gradient change in size in the first image, so as to perform visual algorithm calibration while implementing visual accuracy calibration. In addition, a comparison is made between the inspection value and standard value of the color card calibration parts with a gradient change in gray value in the second image, so as to perform visual algorithm calibration while implementing imaging effect calibration. In this way, the systematic calibration result of the visual inspection apparatus is achieved.

In these embodiments, the visual accuracy calibration result of the visual inspection apparatus may be determined based on the measurement value corresponding to the structural parameter.

In these embodiments, the structural parameter may be the size, depth, thickness, and the like of the size calibration part, and may further include other parameters, which is not limited in these embodiments. A comparison is made based on the structural parameter of the calibration member. Since the value of the structural parameter may be a specific value, a difference between the measurement value and an actual value can be more accurately obtained. For example, the structural parameter being the size of the size calibration part is used as an example for illustration. To implement visual accuracy inspection, the two-dimensional image of the size calibration part on the calibration member is analyzed to obtain dimensions of the size calibration part that is 2 mm in length and 1 mm in width, so that visual accuracy calibration is directly performed based on the measurement values obtained through analysis of the image.

In these embodiments, comparison with the measurement value corresponding to the structural parameter is made to obtain the visual accuracy calibration result. In this way, the visual accuracy calibration is implemented through quantitative data, thereby improving the accuracy of visual inspection.

To obtain the visual accuracy calibration result, a first difference between a preset standard value and the measurement value corresponding to the structural parameter may be further determined, and the visual accuracy calibration result of the visual inspection apparatus is determined based on the first difference.

In these embodiments, the preset standard value may be a value of the structural parameter of the actual inspection target. The measurement value of the structural parameter obtained through analysis of the image and the parameter value of the actual inspection target are obtained based on the difference between the preset standard value and the measurement value corresponding to the structural parameter. For example, the two-dimensional image of the size calibration part on the calibration member is analyzed to obtain a length of 2 mm of the size calibration part and a length of 2.5 mm of the actual inspection target, so there is a difference of 0.5 mm between the measurement value of the structural parameter obtained through analysis of the image and the parameter value of the actual inspection target, meaning that the measurement value of the structural parameter obtained through analysis of the image is inconsistent with the parameter value of the actual inspection target. In this way, it can be known that there is a difference between the current image captured by the visual inspection apparatus and the actual inspection target. Therefore, the visual accuracy of the visual inspection apparatus is abnormal.

Similarly, in a case that the obtained length the size calibration part is 2 mm and the length of the actual inspection target is 2 mm, the measurement value of the structural parameter obtained through analysis of the image is consistent with the parameter value of the actual inspection target. In this case, the current image captured by the visual inspection apparatus is the same as the parameter value of the actual inspection target. Therefore, the visual accuracy of the visual inspection apparatus is normal.

In these embodiments, the visual accuracy calibration result is obtained based on a difference between the measurement value corresponding to the structural parameter and a standard value corresponding to the actual inspection target, so that an error between an image analysis result and an actual result can be effectively obtained, thereby obtaining the accuracy of visual inspection more accurately.

After the first difference between the preset standard value and the measurement value corresponding to the structural parameter is obtained, the visual accuracy calibration result of the visual inspection apparatus is determined based on the first difference and a first parameter threshold range.

In these embodiments, the first parameter threshold range is defined by determining whether the difference is within an allowable range. The difference being within the first parameter threshold range is determined to be within the allowable range, or the difference being out of the first parameter threshold range is determined to be within an unallowable range, so that an appropriate range allowing for certain errors is provided, thereby avoiding misjudgment. For example, the parameter threshold range being less than 0.1 mm is used as an example for illustration. The length of the size calibration part obtained through analysis of the two-dimensional image of the size calibration part on the calibration member is 2 mm, and the length of the actual inspection target is 2.5 mm, so a difference between the measurement value of the structural parameter obtained through analysis of the image and the parameter value of the actual inspection target is 0.5 mm, exceeding the parameter threshold range. In this way, it can be known that the visual accuracy of the visual inspection apparatus is abnormal.

Similarly, the parameter threshold range being less than 0.1 mm is used as an example for illustration. The length of the size calibration part obtained through analysis of the two-dimensional image of the size calibration part on the calibration member is 2 mm, and the length of the actual inspection target is 2.03 mm, so a difference between the measurement value of the structural parameter obtained through analysis of the image and the parameter value of the actual inspection target is 0.03 mm, not exceeding the parameter threshold range. In this way, it can be known that the visual accuracy of the visual inspection apparatus is normal.

In a specific implementation, as shown in FIG. 13, step S801 includes the following steps.

Step S805: The upper computer determines the first difference between the preset standard value and the measurement value corresponding to the structural parameter of the size calibration part in the first image.

Step S806: In a case that the first difference is greater than or equal to the first parameter threshold range, the upper computer obtains a calibration result indicating that visual accuracy of the visual inspection apparatus is abnormal.

Step S807: In a case that the first difference is less than the first parameter threshold range, the upper computer obtains a calibration result indicating that visual accuracy of the visual inspection apparatus is normal.

In these embodiments, the parameter threshold range may be further flexibly adjusted based on actual requirements, thereby improving accuracy inspection flexibility.

In these embodiments, the difference between the measurement value corresponding to the structural parameter and the standard value corresponding to the actual inspection target is compared with the parameter threshold range, so as to obtain the visual accuracy calibration result. Compared to a case that a comparison is made based on the difference only, a specified threshold range is given, and an inspection result is considered abnormal only if the difference exceeds the range, thereby improving the accuracy of visual accuracy inspection.

According to some embodiments of this application, optionally, the following step is further included.

Step S808: The upper computer determines the first parameter threshold range based on a tolerance corresponding to the structural parameter.

In these embodiments, the tolerance is a variation corresponding to each structural parameter, equal to an absolute value of an algebraic difference between an upper limit and a lower limit. For example, in terms of size, 1 mm is the tolerance corresponding to the size parameter; or in terms of area, 1 mm$^2$ is the tolerance corresponding to the size parameter. Since when the measurement value is compared with the parameter value, if the parameter threshold uses a fixed tolerance for comparison, a comparison error is caused. The first parameter threshold range may be less than T/10, where T represents the tolerance corresponding to the structural parameter, that is, for camera accuracy calibration: |measurement value-standard value|<T/10. For example, when the size in the structural parameter is used for comparison, a difference between the measurement value of the structural parameter obtained through analysis of the image and the parameter value of the actual inspection target is 0.03 mm, and the difference is compared with the parameter threshold range corresponding to the size parameter being less than 0.1 mm, not compared with the parameter threshold range corresponding to the area parameter being less than 1 mm$^2$, thereby avoiding causing misjudgment.

In these embodiments, before the parameter threshold range is obtained, the parameter threshold range is determined based on the tolerance corresponding to the structural parameter. Since different structural parameters correspond to different standards, determining the parameter threshold range based on the tolerance corresponding to the parameter makes the parameter threshold range is compatible with the structural parameter, thereby improving the reasonableness of visual accuracy inspection.

According to some embodiments of this application, as shown in FIG. 14, optionally, the visual inspection method further includes the following steps.

Step S809: The upper computer performs inspection on the first image through a target visual algorithm to obtain a target standard value corresponding to the structural parameter.

Step S810: The upper computer determines a second difference between the target standard value and the measurement value corresponding to the structural parameter of the size calibration part in the first image.

Step S811: In a case that the second difference is greater than or equal to a second parameter threshold range, the upper computer obtains a calibration result indicating that a result of a visual algorithm of the visual inspection apparatus is abnormal.

Step S812: In a case that the second difference is less than the second parameter threshold range, the upper computer obtains a calibration result indicating that a result of a visual algorithm of the visual inspection apparatus is normal.

It should be noted that the upper computer can determine a first visual algorithm calibration result of the visual inspection apparatus based on the measurement value corresponding to the structural parameter.

In these embodiments, the measurement value corresponding to the structural parameter is compared with a measurement value obtained through a good visual analysis algorithm, thereby implementing visual algorithm calibration. For example, a length of the size calibration part obtained through analysis of the two-dimensional image of the size calibration part on the calibration member is 2 mm, and a measurement value obtained through analysis of the two-dimensional image of the size calibration part on the calibration member is 1.8 mm, thereby implementing calibration of the visual algorithm.

In a case that the measurement value of the size calibration part obtained through analysis of the two-dimensional image of the size calibration part on the calibration member is consistent with the measurement value obtained through analysis of the two-dimensional image of the size calibration part on the calibration member using the good visual analysis algorithm, it is determined that the current visual algorithm is normal. In a case that the obtained measurement value of the size calibration part is inconsistent with the measurement value obtained through analysis of the two-dimensional image of the size calibration part on the calibration member using the good visual analysis algorithm, it is determined that the current visual algorithm is abnormal. In this way, the visual algorithm inspection is implemented.

In these embodiments, in addition to being used for visual accuracy inspection, the measurement value corresponding to the structural parameter may also be used for visual algorithm calibration, so that systematic visual calibration is implemented, thereby improving comprehensiveness and effectiveness of monitoring of the production line.

The upper computer can also determine the second difference between the target standard value and the measurement value corresponding to the structural parameter, and determine the first visual algorithm calibration result of the visual inspection apparatus is determined based on the second difference.

In these embodiments, the target standard value may be the measurement value obtained through inspection using the good visual algorithm. Based on the difference between the target standard value and the measurement value corresponding to the structural parameter, a difference is obtained between the measurement value of the structural parameter obtained through analysis of the image and the measurement value obtained through inspection using the good visual algorithm. For example, a length of the size calibration part obtained analysis of the two-dimensional image of the size calibration part on the calibration member is 2 mm, and a measurement value obtained through analysis of the two-dimensional image of the size calibration part on the calibration member using the good visual analysis algorithm is 2.5 mm, so there is a difference of 0.5 mm between the measurement value of the structural parameter obtained through analysis of the image and the measurement value obtained through analysis of the two-dimensional image of the size calibration part on the calibration member using the good visual analysis algorithm, meaning that the measurement value of the structural parameter obtained through analysis of the image is inconsistent with the measurement value obtained through analysis of the two-dimensional image of the size calibration part on the calibration member using the good visual analysis algorithm. In this way, it can be known that there is a difference between inspection results of the current visual algorithm and the good visual algorithm. Therefore, the current visual algorithm is abnormal.

Similarly, in a case that the length of the size calibration part is 2 mm and the measurement value obtained through analysis of the two-dimensional image of the size calibration part on the calibration member using the good visual analysis algorithm is 2 mm, the measurement value of the structural parameter obtained through analysis of the image is consistent with the measurement value obtained through analysis of the two-dimensional image of the size calibration part on the calibration member using the good visual analysis algorithm. In this way, it can be known that the current visual algorithm and the good visual algorithm have the same inspection results. Therefore, the current visual algorithm is normal.

In these embodiments, the measurement value corresponding to the structural parameter is compared with a measurement value of the structural parameter analyzed through a normal visual inspection algorithm, so as to obtain a difference between an analysis result of the current visual algorithm and an analysis result detected through the normal visual inspection algorithm. In this way, a difference between the current visual algorithm and the normal visual inspection algorithm is obtained, thereby implementing calibration of the visual algorithm.

In these embodiments, the target visual algorithm is a good visual algorithm that has been calibrated. To facilitate comparison with the measurement value of the current visual algorithm, the size calibration part is also analyzed through the target visual algorithm to obtain the target standard value corresponding to the structural parameter, so that the target standard value is compared with the current measurement value. For example, a measurement value of 2 mm is obtained through analysis of the two-dimensional image of the size calibration part on the calibration member using the good visual analysis algorithm, and the measurement value 2 mm is used as the target standard value, so that analysis is performed based on a same analysis target through different visual algorithms, avoiding that different analysis targets are used for comparison, thereby avoiding affecting the accuracy of a comparison result.

In these embodiments, to more effectively obtain the difference between the current visual algorithm and the normal visual inspection algorithm, the size calibration part is analyzed through the target visual algorithm to obtain the target standard value corresponding to the structural parameter, so that the target standard value can be compared with the measurement value corresponding to the structural parameter. This realizes a unified standard for comparison between the current visual algorithm and the normal visual inspection algorithm, thereby improving the accuracy of visual algorithm calibration.

In these embodiments, the second parameter threshold range is defined by determining whether the difference is within an allowable range. The difference being within the second parameter threshold range is determined to be within the allowable range, and the difference being out of the second parameter threshold range is determined to be within an unallowable range, so that an appropriate range allowing for certain errors is provided, thereby avoiding misjudgment. For example, the second parameter threshold range may be $T/10$, where T represents the tolerance corresponding to the inspection target, that is, for visual algorithm calibration: |measurement value-standard value|$<T/10$. For example, the parameter threshold being less than 0.1 mm is used as an example for illustration. The length of the size calibration part obtained through analysis of the two-dimensional image of the size calibration part on the calibration member is 2 mm, and the length obtained through inspection using the good visual algorithm is 2.5 mm, so a difference between the measurement value of the structural parameter obtained through analysis of the image and the parameter value obtained through inspection using the good visual algorithm is 0.5 mm, exceeding the parameter threshold range. In this way, it can be known that a result of the visual algorithm of the visual inspection apparatus is abnormal.

Similarly, the parameter threshold range being less than 0.1 mm is used as an example for illustration. The length of the size calibration part obtained through analysis of the two-dimensional image of the size calibration part on the calibration member is 2 mm, and the length obtained through inspection using the good visual algorithm is 2.03 mm, so a difference between the measurement value of the structural parameter obtained through analysis of the image and the parameter value obtained through inspection using the good visual algorithm is 0.03 mm, not exceeding the parameter threshold range. In this way, it can be known that a result of the visual algorithm of the visual inspection apparatus is normal.

In a specific implementation, the parameter threshold range may be further flexibly adjusted based on actual requirements, thereby improving accuracy inspection flexibility.

Figure 15:
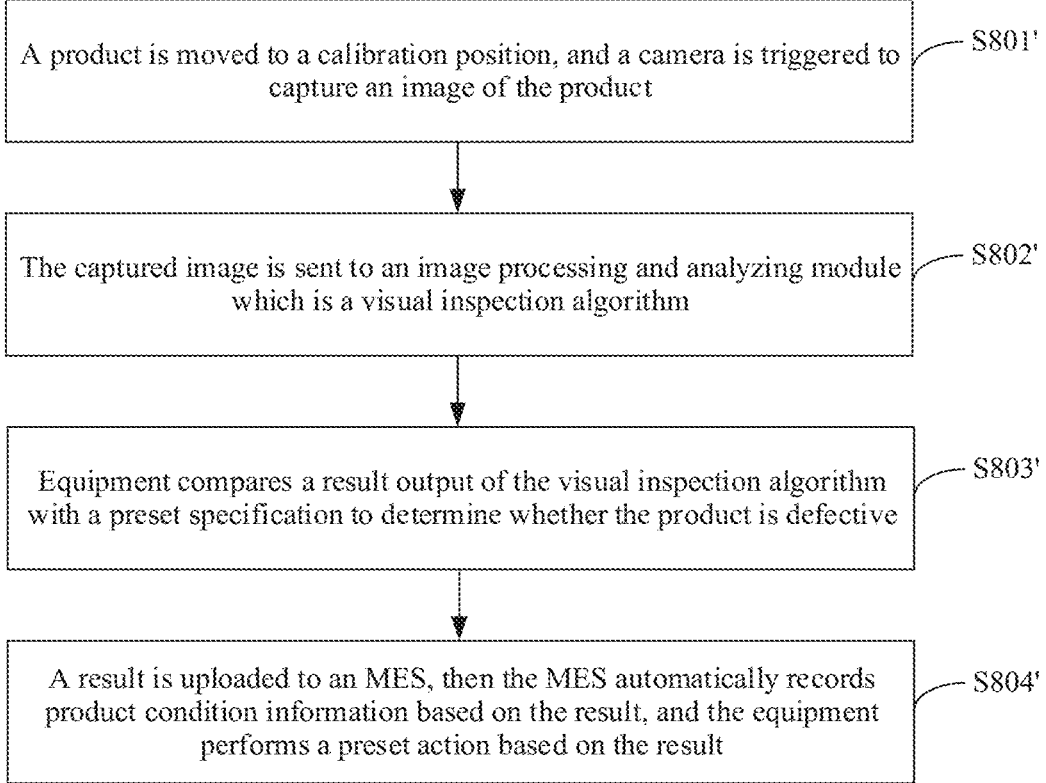
FIG. 15 is a second overall schematic flowchart of a visual inspection method according to some embodiments of this application.

FIG. 15 is a schematic flowchart of calibration of a visual system. The procedures are as follows: S801': A product is moved to the calibration position, and a camera is triggered to capture an image of the product. S802': The captured image is sent to an image processing and analyzing module which is the visual inspection algorithm. S803': Equipment compares a result output of the visual inspection algorithm with a preset rule to determine whether the product is defective. S804': A result is uploaded to the manufacturing execution system (Manufacturing Execution System, MES), then the manufacturing execution system automatically records product condition information based on the result, and the equipment performs a preset action based on the result.

The manufacturing execution system is an industrial production management system that is used to optimize and monitor the whole manufacturing process from raw materials to final products. The manufacturing execution system interacts with various equipment, systems, and operators to coordinate various aspects of production activities, including planning, execution, control, and monitoring. It is typically integrated with other information systems of enterprises, such as enterprise resource planning (Enterprise Resource Planning, ERP), product lifecycle management (product lifecycle management, PLM), and supply chain management (Supply Chain Management, SCM), to implement more efficient, flexible, and visualized production management.

It can be seen from the procedure that in the production process, if an image is captured normally in the first step, the hardware such as a camera and a light source work properly, and the obtained image is stable. In this part, camera accuracy calibration and imaging calibration are designed. Whether the visual algorithm is normal affects determination of whether the product is defective. The algorithm may be designed to determine whether the specification changes and needs to be calibrated.

Figure 16:
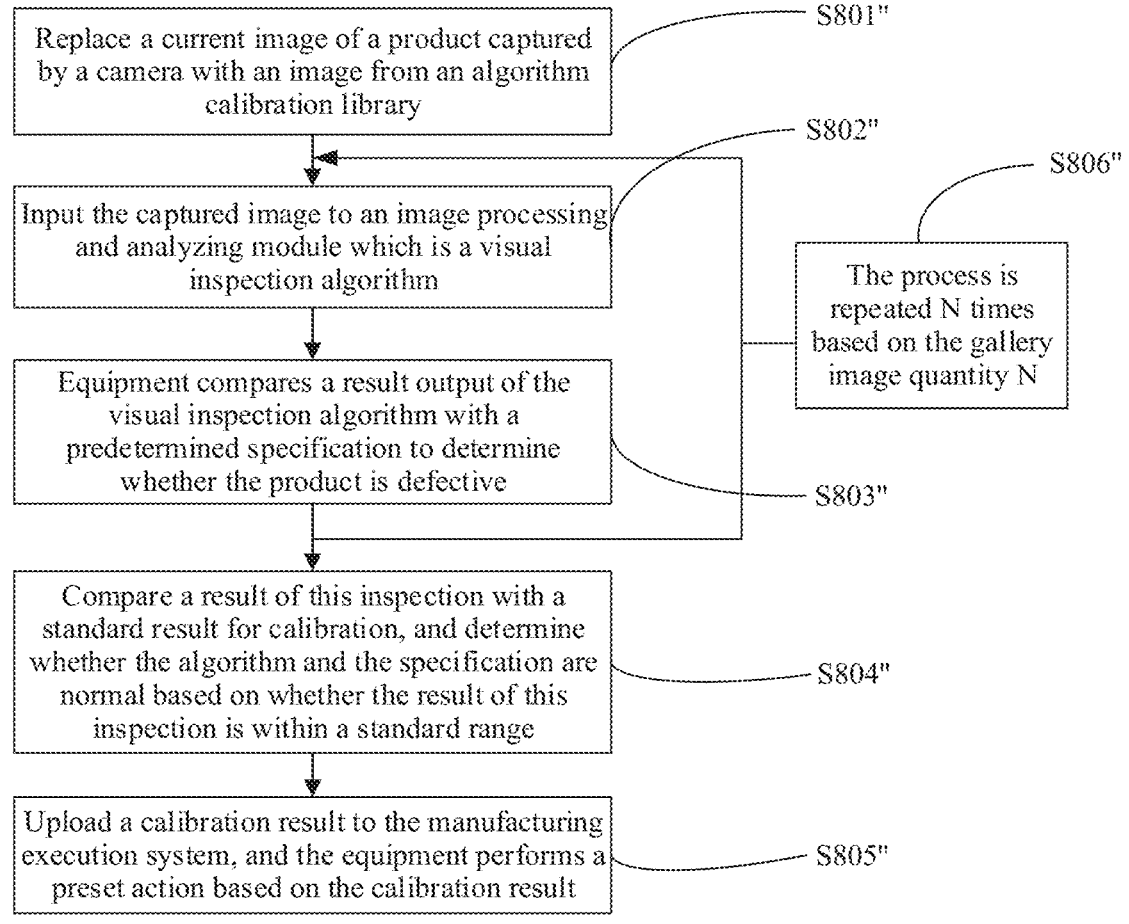
FIG. 16 is a flowchart of visual algorithm inspection of a visual inspection method according to some embodiments of this application.

FIG. 16 is a schematic flowchart of calibration of a visual algorithm. The algorithm calibration includes the following steps: S801": Replace a current image of a product captured by a camera with an image from an algorithm calibration library. S802": Input the captured image to an image processing and analyzing module which is a visual inspection algorithm. S803": Equipment compares a result output of the visual inspection algorithm with a predetermined specification to determine whether the product is defective. S804": Compare a result of this inspection with a standard result for calibration, and determine whether the algorithm and the specification are normal based on whether the result of this inspection is within a standard range. S805": Upload a calibration result to the manufacturing execution system, and the equipment performs a preset action based on the calibration result. S806": The process is repeated N times based on the gallery image quantity N.

It can be seen from the procedure that an algorithm calibration image library is manually determined, with the results known. If the proven algorithm and standard specification are used for inspection, the results are standard. Then, during the algorithm calibration, the product images with known results are inspected, and after algorithm and specification processing, the results should be consistent. If the results are inconsistent, the algorithm is problematic. Inspection data is shown in Table 1.

TABLE 1

| Image No. | Original inspection result | Current inspection result | Original specification | Current specification |
|---|---|---|---|---|
| 1 | 10.0 | 10.09 | 10-11 | 10.5-11 |
| 2 | 10.5 | 10.5 | | |
| 3 | 11.5 | 11.5 | | |
| 4 | 11.0 | 10.8 | | |

The calibration process is as follows: It is determined that |measurement value-standard value|<T/10 based on the calibration result. Based on the specifications, T=11−10=1. In this case, inspection results of images numbered 1, 2, and 3 are within a reasonable range, while an inspection result of an image numbered 4 has a deviation of 0.2 and is not within the reasonable range, so the stability of the algorithm is NG, and there are problems with the measurement system.

According to the specification calibration, the original specifications are 10-11, and the current specifications are 10.5-11, where the original rule is determined during standard formulation, the current rule is a rule read from the settings of the current equipment. If the two are inconsistent, it indicates that the equipment specification is maliciously modified, and there are problems with the measurement system, thereby implementing calibration of the visual algorithm.

In these embodiments, the parameter threshold range is compared with the difference between the measurement value corresponding to the structural parameter and a standard value corresponding to the normal visual inspection algorithm, so as to obtain a visual algorithm calibration result. Specifications are compared to further implement systematic calibration of the visual inspection apparatus. Compared to a case that a comparison is made based on the difference only, a specified threshold range is given, and the visual algorithm is considered abnormal only if the difference exceeds the range, thereby improving the accuracy of visual algorithm calibration.

According to some embodiments of this application, optionally, as shown in FIG. 17, step S802 includes the following steps.

Step S813: The upper computer determines a third difference between a preset gray value and the gray value of the color card calibration part in the second image.

Step S814: In a case that the third difference is greater than or equal to a third parameter threshold range, the upper computer determines an inspection result indicating that an imaging effect of the visual inspection apparatus is abnormal.

Step S815: In a case that the third difference is less than the third parameter threshold range, the upper computer determines an inspection result indicating that an imaging effect of the visual inspection apparatus is normal.

In these embodiment, the gray value is an image expression concept of digital image processing technology, and the gray value refers to a brightness value of a pixel of a gray digital image, indicating shades of the color of the digital image. Gray scale ranges from 0 to 255, where white is 255 and black is 0. The gray image can display different shades of any color, even different colors with different brightness. A comparison is made based on the gray value of the colourimetric card, since the gray value of the colourimetric card may be a specific value, the difference between the measurement value and the actual value can be obtained more accurately. For example, to implement calibration of the imaging effect, for example, a gray value of 50 of the colourimetric card on the calibration member is obtained after analysis of the colourimetric card of the second image, so that calibration of the imaging effect is performed directly based on the gray value analyzed from the image.

In these embodiments, the imaging effect calibration result is obtained based on the gray value of the colourimetric card, so that calibration of the imaging effect is implemented through quantitative data, thereby improving the accuracy of systematic calibration.

In these embodiments, the preset gray value may be a gray value of the actual inspection target. A difference between the corresponding measurement value and the preset standard value is obtained through analysis of the image of the colourimetric card, so that the measurement value of the colourimetric card obtained through analysis of the image and the gray value of the actual inspection target are obtained. For example, a gray value of 50 of the colourimetric card on the calibration member is obtained after analysis of the colourimetric card of the second image, and a gray value at a same position of the actual colourimetric card is 60, so there is a difference of 10 between the measurement value obtained through analysis of the image and the parameter value of the actual inspection target, meaning that the current measurement value obtained through analysis of the image is inconsistent with the parameter value of the actual inspection target. In this way, it can be known that there is a difference between the current image captured by the visual inspection apparatus and the actual inspection target. Therefore, the imaging effect of the visual inspection apparatus is abnormal.

Similarly, a gray value of 50 of the colourimetric card on the calibration member is obtained after analysis of the colourimetric card of the second image, and a gray value at a same position of the actual colourimetric card is 50, so the measurement value obtained through analysis of the image is consistent with the parameter value of the actual inspection target. In this way, it can be seen that the current image captured by the visual inspection apparatus is the same as the parameter value of the actual inspection target. Therefore, the imaging effect of the visual inspection apparatus is normal.

In these embodiments, the imaging effect calibration result is obtained based on a difference between the gray value and the gray value corresponding to the actual inspection target, so that an error between an image analysis result and an actual result can be effectively obtained, thereby implementing inspection of the imaging effect more accurately.

In these embodiments, the third parameter threshold range is defined by determining whether the difference of the gray values is within an allowable range. The difference being within the third parameter threshold range is determined to be within the allowable range, and the difference being out of the third parameter threshold range is determined to be within an unallowable range, so that a specified reasonable range with allowable errors is provided, thereby avoiding misjudgment. The third parameter threshold range may be 10, that is, imaging effect calibration: |measurement value-standard value|<T/10. For example, the parameter threshold range being less than 6 is used as an example for illustration. A gray value of 50 of the colourimetric card on the calibration member is obtained after analysis of the colourimetric card of the second image, and a gray value at a same position of the actual colourimetric card is 60, so a difference between the measurement value obtained through analysis of the image and the parameter value of the actual inspection target is 10, exceeding the parameter threshold range. In this way, it can be seen that the imaging effect of the visual inspection apparatus is abnormal.

Similarly, the parameter threshold range being less than 6 is used as an example for illustration. A gray value of 50 of the colourimetric card on the calibration member is obtained after analysis of the colourimetric card of the second image, and a gray value at a same position of the actual colourimetric card is 55, so a difference between the measurement value obtained through analysis of the image and the parameter value of the actual inspection target is 5, not exceeding the parameter threshold range. In this way, it can be seen that the imaging effect of the visual inspection apparatus is abnormal.

In a specific implementation, the parameter threshold range may be further flexibly adjusted based on actual requirements, thereby improving accuracy inspection flexibility.

In these embodiments, the parameter threshold range is compared with a difference between a current gray value and the standard value corresponding to the actual inspection target, so as to obtain the imaging effect calibration result. Compared to a case that a comparison is made based on the difference only, a specified threshold range is given, and an inspection result is considered abnormal only if the difference exceeds the range, thereby improving the accuracy of imaging effect inspection.

According to some embodiments of this application, optionally, as shown in FIG. 18, the visual inspection method further includes the following steps.

Step S816: The upper computer performs inspection on the second image through the target visual algorithm to obtain a target gray value.

Step S817: The upper computer determines a fourth difference between the target gray value and the gray value of the color card calibration part in the second image.

Step S818: In a case that the fourth difference is greater than or equal to a fourth parameter threshold range, the upper computer obtains a calibration result indicating that a result of a visual algorithm of the visual inspection apparatus is abnormal.

Step S819: In a case that the fourth difference is less than the fourth parameter threshold range, the upper computer obtains a calibration result indicating that a result of a visual algorithm of the visual inspection apparatus is normal.

In these embodiments, the gray value obtained through analysis using the current visual algorithm is compared with a gray value obtained through the good visual analysis algorithm, thereby implementing calibration of the visual algorithm. For example, a gray value of 50 of the colourimetric card on the calibration member is obtained after analysis of the colourimetric card of the second image, and a gray value of 60 at a same position of the colourimetric card on the calibration member is calibrated through the good visual analysis algorithm, thereby implementing calibration of the visual algorithm.

During analysis of the image of the size calibration part on the calibration member, in a case that the measurement value of the size calibration part is consistent with the measurement value obtained through analysis of the two-dimensional image of the size calibration part on the calibration member using the good visual analysis algorithm, it is determined that the current visual algorithm is normal, or in a case that the measurement value of the size calibration part is inconsistent with the measurement value obtained through analysis of the two-dimensional image of the size calibration part on the calibration member using the good visual analysis algorithm, it is determined that the current visual algorithm is abnormal, thereby implementing inspection of the visual algorithm.

In these embodiments, in addition to being used for imaging effect inspection, the gray value may also be used for visual algorithm calibration, so that systematic visual calibration is implemented, thereby improving comprehensiveness and effectiveness of monitoring of the production line.

In these embodiments, the target gray value may be the measurement value obtained through inspection using the good visual algorithm. Based on the difference between the gray value of the colourimetric card and a target standard value, a difference is obtained between the measurement value obtained through analysis of the image and the measurement value obtained through inspection using the good visual algorithm. For example, a gray value of the colourimetric card on the calibration member obtained after analysis of the colourimetric card of the second image is 50, and a gray value at a same position of the colourimetric card on the calibration member calibrated through the good visual analysis algorithm is 60, so there is a difference of 10 between the measurement value obtained through analysis of the image and the parameter value of the measurement value obtained through analysis of the image of the colourimetric card on the calibration member using the good visual analysis algorithm, meaning that the measurement value obtained through analysis of the image is inconsistent with the measurement value obtained through analysis of the two-dimensional image of the size calibration part on the calibration member using the good visual analysis algorithm. In this way, it can be known that there is a difference between inspection results of the current visual algorithm and the good visual algorithm. Therefore, the current visual algorithm is abnormal.

Similarly, a gray value of the colourimetric card on the calibration member obtained after analysis of the colourimetric card is 50, and a gray value at a same position of the colourimetric card on the calibration member calibrated through the good visual analysis algorithm is 50, so the measurement value obtained through analysis of the image is consistent with the measurement value obtained through analysis of the colourimetric card on the calibration member using the good visual analysis algorithm. In this way, it can be known that the current visual algorithm and the good visual algorithm have the same inspection results. Therefore, the current visual algorithm is normal.

In these embodiments, the gray value is compared with the gray value obtained by analysis through the normal visual inspection algorithm, so as to obtain a difference between an analysis result detected through the current visual algorithm and an analysis result detected through the normal visual inspection algorithm. In this way, a difference between the current visual algorithm and the normal visual inspection algorithm is obtained, thereby implementing calibration of the visual algorithm.

In these embodiments, the target visual algorithm is a good visual algorithm that has been calibrated. To facilitate comparison with the measurement value of the current visual algorithm, the colourimetric card is analyzed through the target visual algorithm to obtain the target standard value corresponding to the colourimetric card, so that the target standard value is compared with the current measurement value. For example, a gray value of 50 at a same position of the colourimetric card on the calibration member is calibrated through the good visual analysis algorithm, and a gray value of 50 is used as the target standard value, so that analysis is performed based on a same analysis target through different visual algorithms, avoiding that different analysis targets are used for comparison, which otherwise affects the accuracy of a comparison result.

In these embodiments, to more effectively obtain the difference between the current visual algorithm and the normal visual inspection algorithm, the colourimetric card is analyzed through the target visual algorithm to obtain the target standard value corresponding to the colourimetric card, so that the target standard value can be compared with a gray value obtained through the current visual algorithm, so as to realize a unified standard of comparison between the current visual algorithm and the normal visual inspection algorithm, thereby improving the accuracy of visual algorithm calibration.

In these embodiments, the fourth parameter threshold range is defined by determining whether the difference of the gray values is within an allowable range. The difference being within the fourth parameter threshold range is determined to be within the allowable range, and the difference being out of the fourth parameter threshold range is determined to be within an unallowable range, so that an appropriate range allowing for certain errors is provided, thereby avoiding misjudgment. For example, the fourth parameter threshold range may be 10, that is, for visual algorithm calibration: measurement value-standard value|<10. For example, the parameter threshold being less than 10 is used as an example for illustration. A gray value of the colourimetric card on the calibration member obtained through analysis of the colourimetric card is 50, and a gray value at a same position of the colourimetric card on the calibration member calibrated through the good visual analysis algorithm is 60, so a difference between the measurement value obtained through analysis of the image and the parameter value obtained through inspection using the good visual algorithm is 10, exceeding the parameter threshold range. In this way, it can be known that a result of the visual algorithm of the visual inspection apparatus is abnormal.

Similarly, the parameter threshold range being less than 10 is used as an example for illustration. A gray value of the colourimetric card on the calibration member obtained after analysis of the colourimetric card is 50, and a gray value at a same position of the colourimetric card on the calibration member calibrated through the good visual analysis algorithm is 55, so a difference between the measurement value obtained through analysis of the image and the parameter value obtained through inspection using the good visual analysis algorithm is 5, not exceeding the parameter threshold range. In this way, it can be known that a result of the visual algorithm of the visual inspection apparatus is normal.

In a specific implementation, the parameter threshold range may be further flexibly adjusted based on actual requirements, thereby improving accuracy inspection flexibility.

In these embodiments, the parameter threshold range is compared with a difference between a gray value corresponding to the current visual algorithm and the standard value corresponding to the normal visual inspection algorithm, so as to obtain a visual algorithm calibration result. Compared to a case that a comparison is made based on the difference only, a specified threshold range is given, and the visual algorithm is considered abnormal only if the difference exceeds the range, thereby improving the accuracy of visual algorithm calibration.

According to some embodiments of this application, optionally, as shown in FIG. 19, before step S803, the following step is further included.

Step S820: The upper computer obtains a first image, second image, third image, and fourth image with parameter values calibrated, where the parameter value of the first image is within a first range, the parameter value of the second image is within a second range, the parameter value of the third image is within a third range, and the parameter value of the fourth image is within a fourth range, where the first range is different from the second range, and the third range is different from the fourth range; and establishes an image calibration library based on the first image, the second image, the third image, and the fourth image.

In these embodiments, the first image may be a normal image, the second image may be a normal limit image, the third image may be an abnormal image, and the fourth image may be an abnormal limit image, and the product image calibration library needs to have NG products, NG limit samples, OK products, and OK limit samples, and defects of each of the NG product and NG limit sample are not less than 3EA, and defects of each of the OK product and OK limit sample are not less than 3EA. Images of products with typical defects are collected, or the typical defects are manually created, then a camera is used to shoot and store the images, so that the calibration library is established.

In these embodiments, as compared with direct comparison of the calibration result, the visual algorithm inspection being implemented through the pre-established image calibration library features higher calibration efficiency.

In a specific implementation, the upper computer numbers the first image, the second image, the third image, and the fourth image, and establishes the image calibration library based on the numbered first image, second image, third image, and fourth image.

In these embodiments, the images are numbered and analyzed through a perfect algorithm to obtain a result, and the result is set as a standard value. The numbering method may be a code identification method or another method, which is not limited in these embodiments. The numbering method can implement the positioning and tracking of images, facilitating management of the image library.

In these embodiments, when the image calibration library is established, image samples are managed through numbering, thereby implementing effective management of the image calibration library and also facilitating subsequent adjustment and update of the image calibration library.

According to some embodiments of this application, optionally, the following step is further included.

Step S821: The upper computer evaluates a sample image through a target visual inspection algorithm to obtain the first image, second image, third image, and fourth image with parameter values calibrated.

In these embodiments, the image in the calibration library is analyzed through a perfect algorithm to obtain a result, and the result is set as a standard value. For example, the length in the structural parameter is 5 mm, where the structural parameter corresponds to an image A and is obtained through analysis using a good visual algorithm, thereby facilitating calibration of the visual algorithm.

In these embodiments, the sampled image is evaluated in advance through a perfect visual inspection algorithm, and an evaluated parameter value is used as a standard value for subsequent comparison, to implement calibration of the visual algorithm.

According to some embodiments of this application, optionally, as shown in FIG. 20, step S803 includes the following steps.

Step S818': Select a target image from the image calibration library.

Step S819': Perform image recognition on the target image through the visual inspection apparatus to obtain a parameter value of the target image.

Step S820': Compare the parameter value with a calibrated parameter value corresponding to the target image.

Step S821': In a case that a difference between the parameter value and the calibrated parameter value corresponding to the target image exceeds a fifth parameter threshold range, determine that a visual algorithm is abnormal.

In these embodiments, after the visual system completes the accuracy and imaging calibration results, the visual system performs algorithm calibration. The visual algorithm traverses an algorithm calibration image library to obtain a result parameter of a calibration image after the algorithm analysis. If the obtained result parameter is the same as a predetermined standard parameter or within a reasonable error range of the predetermined standard parameter, it indicates that the accuracy of the algorithm is good. For algorithm calibration: |measurement value-standard value|<T/10, where T represents the tolerance of the inspection object. If there is a large deviation between the obtained result parameter and the predetermined standard parameter, it indicates that the visual algorithm is abnormal due to the problems such as algorithm parameters, optimization iteration of inspection specifications, or artificial illegal changes in the visual algorithm, and the algorithm is in a state of failure and the accuracy of the algorithm is abnormal.

Figure 21:
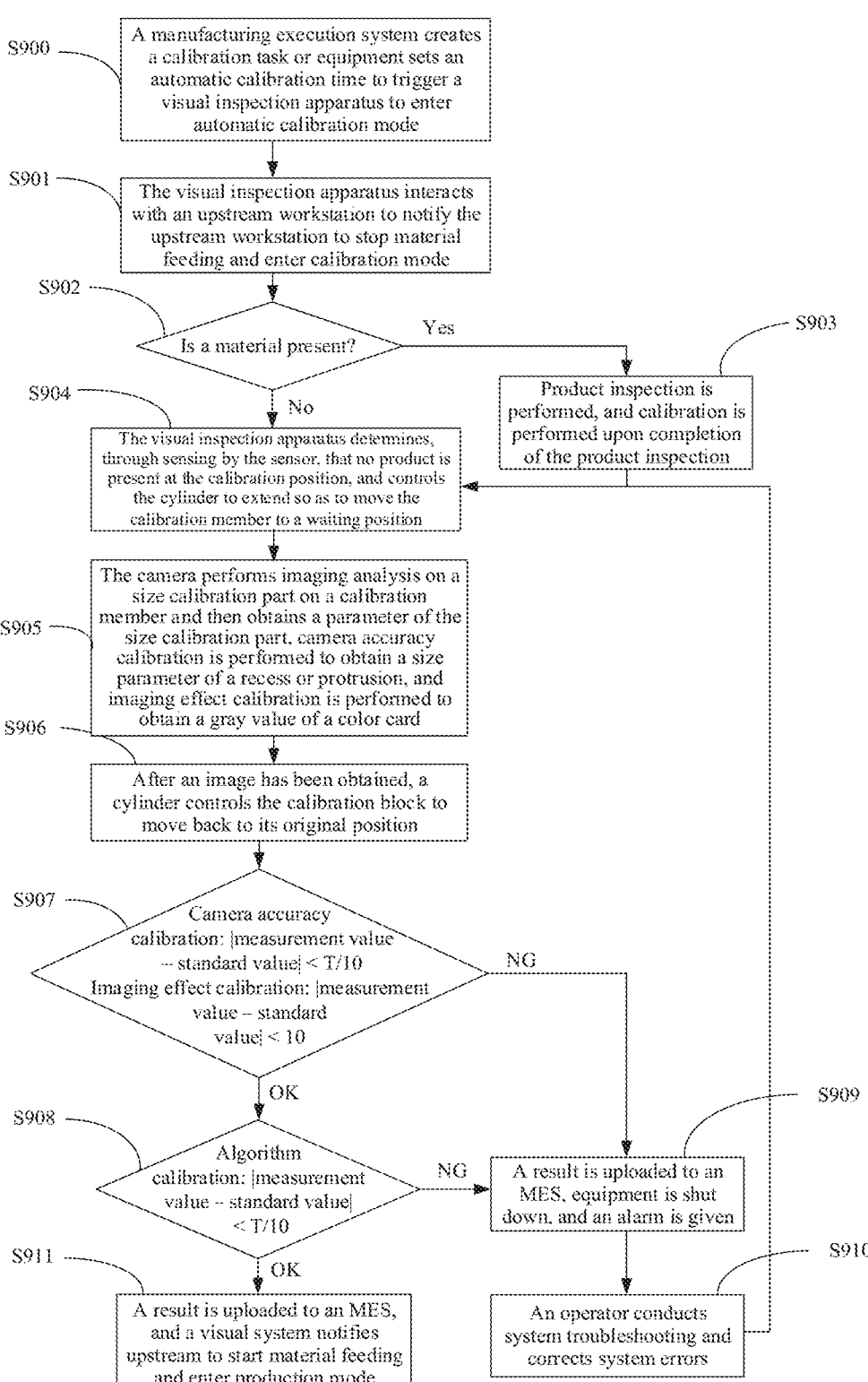
FIG. 21 is a third overall schematic flowchart of a visual inspection method according to some embodiments of this application.

According to some embodiments of this application, as shown in FIG. 21, a specific implementation is provided, including the following steps.

Step S900: The manufacturing execution system creates a calibration task or equipment sets an automatic calibration time to trigger the visual inspection apparatus to enter automatic calibration mode.

Step S901: The visual inspection apparatus interacts with the upstream workstation to notify the upstream workstation to stop material feeding and enter calibration mode.

Step S902: The visual inspection apparatus determines, through the sensor, whether a material is present at the calibration position.

Step S903: The last product is inspected if a material is present at the calibration position. If no material is present at the calibration position, calibration is started.

Step S904: The visual inspection apparatus determines, through sensing by the sensor, that no product is present at the calibration position, and controls the cylinder to extend so as to move the calibration member to a waiting position.

Step S905: The camera performs imaging analysis on the size calibration part on the calibration member and then obtains the parameter of the size calibration part, camera accuracy calibration is performed to obtain the size parameter of the recess or protrusion, and imaging effect calibration is performed to obtain the gray value of the color card.

Step S906: After the image of the calibration member has been obtained, the cylinder is triggered and controlled to retract to its original position so as to move the calibration member back to its original position.

Step S907: The obtained structural parameter is compared with a predetermined structural parameter. If the obtained structural parameter is the same as the predetermined structural parameter or within a reasonable error range of the predetermined structural parameter, it indicates that the obtained structural parameter of the recess or protrusion has no distortion, a lens loose and defocused, the structural parameter of the color card is unchanged, the brightness of light source, camera aperture, camera exposure, gain, and the like are unchanged, and the accuracy and imaging quality of the camera are good. The camera and the light source are in normal working conditions (camera accuracy calibration: |measurement value−standard value|<T/10, and imaging effect calibration: |measurement value−standard value|<10, where T represents the tolerance of the inspection object). If there is a large deviation between the obtained structural parameter of the recess or protrusion and the predetermined structural parameter, it indicates that the obtained structural parameter has distortion, or the lens is loose and defocused, so that the accuracy of the camera becomes poor and the camera is in an abnormal working state. If there is a large deviation between the obtained gray value of the color card and the predetermined gray value, it indicates that the brightness of the light source, camera aperture, camera exposure, gain, and the like are changed, the imaging effect is poor, and an imaging system (which includes the camera and the light source) is in an abnormal working state. After the visual inspection apparatus completes accuracy calibration and imaging calibration and obtains results, the visual inspection apparatus performs algorithm calibration.

Step S908: The visual algorithm traverses an algorithm calibration image library to obtain a result parameter of a calibration image after the algorithm analysis. If the obtained result parameter is the same as a predetermined standard parameter or within a reasonable error range of the predetermined standard parameter, it indicates that the accuracy of the algorithm is good. For algorithm calibration: |measurement value−standard value|<T/10, where T represents the tolerance of the inspection object. If there is a large deviation between the obtained result parameter and the predetermined standard parameter, it indicates that the visual algorithm is abnormal due to the problems such as algorithm parameters, optimization iteration of inspection specifications or artificial illegal changes in the visual algorithm, and the algorithm is in a state of failure and the accuracy of the algorithm is abnormal.

Step S909: Various parameters and comparison results obtained are uploaded to the manufacturing execution system. The manufacturing execution system compares the structural parameters again. If any of the results is NG, the manufacturing execution system performs device lock, preventing the inspection system from producing. The equipment gives an alarm simultaneously.

Step S910: An operator needs to conduct system troubleshooting and adjustment based on the NG items and correct visual inspection errors in a timely manner, to ensure that the visual inspection system still has good accuracy after a long time or after adjustment.

Step S911: The visual inspection apparatus interacts with the upstream workstation to notify the upstream workstation to start material feeding and enter the production mode.

The invention claimed is:

1. A visual inspection system, wherein the visual inspection system comprises:
   a visual calibrator, comprising a calibration structure and a calibration structure mover, wherein the calibration structure mover comprises a movable mounting plate, the mounting plate is able to be located at a calibration position within a movement range of the mounting plate, the calibration position is located within an inspection range of a visual inspector, and the calibration structure is disposed on the mounting plate;
   the visual inspector, configured to obtain an image of the calibration structure and send the image of the calibration structure to an upper computer; and
   the upper computer, configured to determine, based on the image of the calibration structure, a systematic calibration result of the visual inspector,
   wherein the calibration structure comprises a plurality of size calibration parts with a gradient change in size and a plurality of color card calibration parts with a gradient change in gray value;
   the visual inspector is further configured to obtain a first image of the size calibration part and a second image of the color card calibration part and send the first image and the second image to the upper computer; and
   the upper computer is further configured to determine, based on the first image and/or the second image, the systematic calibration result of the visual inspector.

2. The visual inspection system according to claim 1, wherein the visual calibrator further comprises:
   a support base; and
   a driver, comprising a fixed part and a movable part moving linearly relative to each other, wherein the fixed part is disposed on the support base, and the movable part is connected to the mounting plate.

3. The visual inspection system according to claim 2, wherein the visual calibrator further comprises a sliding guide structure, wherein the sliding guide structure comprises a sliding rail and a slider in sliding fit with each other, and the sliding rail and the slider are disposed between the support base and the mounting plate.

4. The visual inspection system according to claim 3, wherein the visual calibrator further comprises an adapting seat, the sliding rail is provided in two, and the slider is correspondingly provided in two; and
   the sliding rail and the slider fitting with each other as one set are disposed between the support base and the adapting seat, and the sliding rail and the slider fitting with each other as another set are disposed between the mounting plate and the adapting seat.

5. The visual inspection system according to claim 1, wherein the calibration structure comprises:
   a plate body having a calibration surface; and
   a plurality of size calibration parts spaced apart on the calibration surface in a linear direction, wherein the plurality of size calibration parts each have a length dimension in a first direction and a width dimension in a second direction, with a gradient change in the length dimensions of the plurality of size calibration parts and/or a gradient change in the width dimensions of the plurality of size calibration parts, wherein the first direction and the second direction are directions perpendicular to each other in a horizontal plane.

6. The visual inspection system according to claim 5, wherein the size calibration part comprises a protrusion or recess formed on the plate body.

7. The visual inspection system according to claim 5, wherein sizes of the plurality of size calibration parts in a third direction exhibit a gradient change, the third direction being perpendicular to both the first direction and the second direction.

8. The visual inspection system according to claim 5, further comprising color card calibration parts disposed on the calibration surface of the plate body and having a gradient change in gray value.

9. The visual inspection system according to claim 5, wherein a material of the plate body comprises aluminum alloy; and/or roughness of the calibration surface of the plate body is less than a preset roughness threshold.

10. A visual inspection method, wherein a visual inspection system comprises a visual inspector, a visual calibrator, and an upper computer, wherein the visual calibrator comprises a calibration structure and a calibration structure mover, the calibration structure mover comprises a movable mounting plate, the mounting plate is able to be located at a calibration position within a movement range of the mounting plate, the calibration position is located within an inspection range of the visual inspector, and the calibration structure is disposed on the mounting plate; and the visual inspection method comprises:

obtaining, by the visual inspector, an image of the calibration structure and sending the image of the calibration structure to the upper computer; and determining, by the upper computer based on the image of the calibration structure, a systematic calibration result of the visual inspector, wherein the calibration structure comprises a plurality of size calibration parts with a gradient change in size and a plurality of color card calibration parts with a gradient change in gray value; and the visual inspection method further comprises:

obtaining, by the visual inspector, a first image of the size calibration part and a second image of the color card calibration part and sending the first image and the second image to the upper computer; and determining, by the upper computer based on the first image and/or the second image, the systematic calibration result of the visual inspector.

11. The visual inspection method according to claim 10, wherein the visual inspection method further comprises:

in a case of having received a calibration instruction, sending, by the upper computer, the calibration instruction to the visual inspector; and in a case of having received the calibration instruction, notifying, by the visual inspector, a workstation controller to stop material delivery.

12. The visual inspection method according to claim 11, wherein the visual inspection method further comprises:

in a case of having detected that no material is present at a calibration position, notifying, by the visual inspector, a driver in the visual calibrator to move the calibration structure to the calibration position, wherein the calibration position is located within the inspection range of the visual inspector; and in a case of having detected that a material is present at the calibration position, keeping inspecting, by the visual inspector, the current material at the calibration position until a target material leaves the calibration position, and notifying the driver in the visual calibrator to move the calibration structure to the calibration position.

13. The visual inspection method according to claim 10, wherein the visual inspection method further comprises:

in a case of having detected the first image and/or the second image, notifying, by the visual inspector, a driver in the visual calibrator to move the calibration structure out of the calibration position.

14. The visual inspection method according to claim 10, wherein the visual inspection method further comprises:

in a case that the systematic calibration result is normal, notifying, by the upper computer, the workstation controller to start material delivery; and in a case that the systematic calibration result is abnormal, notifying, by the upper computer, all inspection structures to perform shutdown inspection, and giving an alarm.

15. The visual inspection method according to claim 10, wherein the visual inspection method further comprises:

performing, by the upper computer, visual accuracy calibration based on the first image to obtain a visual accuracy calibration result;

performing, by the upper computer, imaging effect calibration based on the second image to obtain an imaging effect calibration result;

in a case that both the visual accuracy calibration result and the imaging effect calibration result are normal calibration results, performing, by the upper computer, visual algorithm calibration based on a target image to obtain a visual algorithm calibration result; and determining, by the upper computer, the systematic calibration result of the visual inspector based on the visual accuracy calibration result, the imaging effect calibration result, and the visual algorithm calibration result.

16. The visual inspection method according to claim 15, wherein the performing, by the upper computer, visual accuracy calibration based on the first image to obtain a visual accuracy calibration result comprises:

determining, by the upper computer, a first difference between a preset standard value and a measurement value corresponding to a structural parameter of the size calibration part in the first image; and in a case that the first difference is greater than or equal to a first parameter threshold range, obtaining, by the upper computer, a calibration result indicating that visual accuracy of the visual inspection apparatus is abnormal; or in a case that the first difference is less than the first parameter threshold range, obtaining, by the upper computer, a calibration result indicating that visual accuracy of the visual inspection apparatus is normal.

17. The visual inspection method according to claim 16, further comprising:

determining, by the upper computer, the first parameter threshold range based on a tolerance corresponding to the structural parameter.

18. The visual inspection method according to claim 16, wherein the visual inspection method further comprises:

performing, by the upper computer, inspection on the first image through a target visual algorithm to obtain a target standard value corresponding to the structural parameter;

determining, by the upper computer, a second difference between the target standard value and the measurement value corresponding to the structural parameter of the size calibration part in the first image; and in a case that the second difference is greater than or equal to a second parameter threshold range, obtaining, by the upper computer, a calibration result indicating that a result of a visual algorithm of the visual inspector is abnormal; or in a case that the second difference is less than the second parameter threshold range, obtaining, by the upper computer, a calibration result indicating that a result of a visual algorithm of the visual inspector is normal.

19. The visual inspection method according to claim 15, wherein the performing, by the upper computer, imaging effect calibration based on the second image to obtain an imaging effect calibration result comprises:

determining, by the upper computer, a third difference between a preset gray value and the gray value of the color card calibration part in the second image; and in a case that the third difference is greater than or equal to a third parameter threshold range, determining, by the upper computer, an inspection result indicating that an imaging effect of the visual inspector is abnormal; or in a case that the third difference is less than the third parameter threshold range, determining, by the upper computer, an inspection result indicating that an imaging effect of the visual inspector is normal.

20. The visual inspection method according to claim 10, wherein the visual inspection method further comprises:

performing, by the upper computer, inspection on a second image through a target visual algorithm to obtain a target gray value;

determining, by the upper computer, a fourth difference between a target gray value and a gray value of a color card calibration part in the second image; and in a case that the fourth difference is greater than or equal to a fourth parameter threshold range, obtaining, by the upper computer, a calibration result indicating that a result of a visual algorithm of the visual inspector is abnormal; or in a case that the fourth difference is less than the fourth parameter threshold range, obtaining, by the upper computer, a calibration result indicating that a result of a visual algorithm of the visual inspector is normal.

21. The visual inspection method according to claim 15, before the performing, by the upper computer, visual algorithm calibration based on a target image to obtain a visual algorithm calibration result, further comprising:

obtaining, by the upper computer, a first image, second image, third image, and fourth image with parameter values calibrated, wherein the parameter value of the first image is within a first range, the parameter value of the second image is within a second range, the parameter value of the third image is within a third range, and the parameter value of the fourth image is within a fourth range, wherein the first range is different from the second range, and the third range is different from the fourth range; and evaluating, by the upper computer, a sample image through a target visual inspection algorithm to obtain the first image, second image, third image, and fourth image with parameter values calibrated.

22. The visual inspection method according to claim 21, wherein the establishing, by the upper computer, an image calibration library based on the first image, the second image, the third image, and the fourth image comprises:

numbering, by the upper computer, the first image, the second image, the third image, and the fourth image; and establishing, by the upper computer, the image calibration library based on the numbered first image, second image, third image, and fourth image.

23. The visual inspection method according to claim 21, before the obtaining, by the upper computer, a first image, second image, third image, and fourth image with parameter values calibrated, further comprising:

evaluating, by the upper computer, a sample image through a target visual inspection algorithm to obtain the first image, second image, third image, and fourth image with parameter values calibrated.

24. The visual inspection method according to claim 21, wherein the performing, by the upper computer, visual algorithm calibration based on a target image to obtain a visual algorithm calibration result comprises:

selecting, by the upper computer, a target image from the image calibration library;

performing, by the upper computer, image recognition on the target image through the visual inspector to obtain a parameter value of the target image;

comparing, by the upper computer, the parameter value with a calibrated parameter value corresponding to the target image; and in a case that a difference between the parameter value and the calibrated parameter value corresponding to the target image exceeds a fifth parameter threshold range, determining, by the upper computer, that visual algorithm is abnormal.

\* \* \* \* \*